US008217928B2

(12) United States Patent
Levey et al.

(10) Patent No.: US 8,217,928 B2
(45) **Date of Patent: *Jul. 10, 2012**

(54) ELECTROLUMINESCENT SUBPIXEL COMPENSATED DRIVE SIGNAL

(75) Inventors: Charles I. Levey, West Henrietta, NY (US); John W. Hamer, Rochester, NY (US)

(73) Assignee: Global OLED Technology LLC, Herndon, VA (US)

( * ) Notice: Subject to any disclaimer, the term of this patent is extended or adjusted under 35 U.S.C. 154(b) by 683 days.

This patent is subject to a terminal disclaimer.

(21) Appl. No.: 12/396,662

(22) Filed: Mar. 3, 2009

(65) Prior Publication Data

US 2010/0225630 A1 Sep. 9, 2010

(51) Int. Cl.
*G06F 3/038* (2006.01)

(52) U.S. Cl. .......................................... 345/211; 345/80

(58) Field of Classification Search ........................ None
See application file for complete search history.

(56) References Cited

U.S. PATENT DOCUMENTS 4,896,947 A 1/1990 Leenhouts
5,034,340 A 7/1991 Tanaka et al.
6,489,631 B2 12/2002 Young et al.
6,518,962 B2 2/2003 Kimura et al.
6,995,519 B2 2/2006 Arnold et al.
7,088,052 B2 * 8/2006 Kimura ...................... 315/169.2
7,116,058 B2 10/2006 Lo et al.
7,199,602 B2 4/2007 Nara et al.
8,026,873 B2 * 9/2011 Leon et al. ...................... 345/76
2003/0057895 A1 3/2003 Kimura
2006/0214888 A1 9/2006 Schneider et al.
2006/0273997 A1 12/2006 Nathan et al.
2008/0048951 A1 2/2008 Naugler, Jr. et al.
2008/0238834 A1 10/2008 Matsuo et al.

OTHER PUBLICATIONS

Kagan et al, Thin-film Transistors, New York: Marcel Dekker, 2003, Sec. 3.5, pp. 121-131.
Shinar, ed. Organic Light-Emitting Devices, a survey, New York: Springer-Verlag 2004, Sec. 3.4, pp. 95-97.
Lee et al, A New a-Si:H tuft Pixel Design Compensating Threshold Voltage Degradation of TFT and OLED, SID 2004 Digest, pp. 264-274.

* cited by examiner

*Primary Examiner* — Jason Olson
(74) *Attorney, Agent, or Firm* — Morgan, Lewis & Bockius LLP

(57) ABSTRACT

An electroluminescent (EL) subpixel, such as an organic light-emitting diode (OLED) subpixel, is compensated for aging effects such as threshold voltage $V_{th}$ shift, EL voltage $V_{oled}$ shift, and OLED efficiency loss. The drive current of the subpixel is measured at one or more measurement reference gate voltages to form a status signal representing the characteristics of the drive transistor and EL emitter of the subpixel. Current measurements are taken in the linear region of drive transistor operation to improve signal-to-noise ratio in systems such as modern LTPS PMOS OLED displays, which have relatively small $V_{oled}$ shift over their lifetimes and thus relatively small current change due to channel-length modulation. Various sources of noise are also suppressed to further increase signal-to-noise ratio.

9 Claims, 14 Drawing Sheets

ELECTROLUMINESCENT SUBPIXEL COMPENSATED DRIVE SIGNAL

CROSS REFERENCE TO RELATED APPLICATION

Reference is made to commonly-assigned, co-pending U.S. patent application Ser. No. 11/962,182 filed Dec. 21, 2007, entitled "Electroluminescent Display Compensated Analog Transistor Drive Signal" to Leon et al, the disclosure of which is incorporated herein.

FIELD OF THE INVENTION

The present invention relates to control of a signal applied to a drive transistor for supplying current through an electroluminescent emitter.

BACKGROUND OF THE INVENTION

Flat-panel displays are of great interest as information displays for computing, entertainment, and communications. For example, electroluminescent (EL) emitters have been known for some years and have recently been used in commercial display devices. Such displays employ both active-matrix and passive-matrix control schemes and can employ a plurality of subpixels. Each subpixel contains an EL emitter and a drive transistor for driving current through the EL emitter. The subpixels are typically arranged in two-dimensional arrays with a row and a column address for each subpixel, and having a data value associated with the subpixel. Single EL subpixels can also be employed for lighting and user-interface applications. EL subpixels can be made using various emitter technologies, including coatable-inorganic light-emitting diode, quantum-dot, and organic light-emitting diode (OLED).

Electroluminescent (EL) technologies, such as organic light-emitting diode (OLED) technology, provide benefits in luminance and power consumption over other technologies such as incandescent and fluorescent lights. However, EL subpixels suffer from performance degradation over time. In order to provide a high-quality light emission over the life of a subpixel, this degradation must be compensated for.

The light output of an EL emitter is roughly proportional to the current through the emitter, so the drive transistor in an EL subpixel is typically configured as a voltage-controlled current source responsive to a gate-to-source voltage $V_{gs}$. Source drivers similar to those used in LCD displays provide the control voltages to the drive transistors. Source drivers can convert a desired code value into an analog voltage to control a drive transistor. The relationship between code value and voltage is typically non-linear, although linear source drivers with higher bit depths are becoming available. Although the nonlinear code value-to-voltage relationship has a different shape for OLEDs than the characteristic LCD S-shape (shown in e.g. U.S. Pat. No. 4,896,947), the source driver electronics required are very similar between the two technologies. In addition to the similarity between LCD and EL source drivers, LCD displays and EL displays are typically manufactured on the same substrate: amorphous silicon (a-Si), as taught e.g. by Tanaka et al. in U.S. Pat. No. 5,034,340. Amorphous Si is inexpensive and easy to process into large displays.

Degradation Modes

Amorphous silicon, however, is metastable: over time, as voltage bias is applied to the gate of an a-Si TFT, its threshold voltage ($V_{th}$) shifts, thus shifting its I-V curve (Kagan & Andry, ed. *Thin-film Transistors*. New York: Marcel Dekker, 2003. Sec. 3.5, pp. 121-131). $V_{th}$ typically increases over time under forward bias, so over time, $V_{th}$ shift will, on average, cause a display to dim.

In addition to a-Si TFT instability, modern EL emitters have their own instabilities. For example, in OLED emitters, over time, as current passes through an OLED emitter, its forward voltage ($V_{oled}$) increases and its efficiency (typically measured in cd/A) decreases (Shinar, ed. *Organic Light-Emitting Devices: a survey*. New York: Springer-Verlag, 2004. Sec. 3.4, pp. 95-97). The loss of efficiency causes a display to dim on average over time, even when driven with a constant current. Additionally, in typical OLED display configurations, the OLED is attached to the source of the drive transistor. In this configuration, increases in $V_{oled}$ will increase the source voltage of the transistor, lowering $V_{gs}$ and thus, the current through the OLED emitter ($I_{oled}$), and therefore causing dimming over time.

These three effects ($V_{th}$ shift, OLED efficiency loss, and $V_{oled}$ rise) cause an OLED subpixel to lose luminance over time at a rate proportional to the current passing through that OLED subpixel. ($V_{th}$ shift is the primary effect, $V_{oled}$ shift the secondary effect, and OLED efficiency loss the tertiary effect.) Therefore, the subpixel must be compensated for aging to maintain a specified output over its lifetime.

Prior Art

It has been known to compensate for one or more of the three aging effects. Considering $V_{th}$ shift, the primary effect and one which is reversible with applied bias (Mohan et al., "Stability issues in digital circuits in amorphous silicon technology," Electrical and Computer Engineering, 2001, Vol. 1, pp. 583-588), compensation schemes are generally divided into four groups: in-pixel compensation, in-pixel measurement, in-panel measurement, and reverse bias.

In-pixel $V_{th}$ compensation schemes add additional circuitry to the subpixel to compensate for the $V_{th}$ shift as it happens. For example, Lee et al., in "A New a-Si:H TFT Pixel Design Compensating Threshold Voltage Degradation of TFT and OLED", SID 2004 Digest, pp. 264-274, teach a seven-transistor, one-capacitor (7T1C) subpixel circuit which compensates for $V_{th}$ shift by storing the $V_{th}$ of the subpixel on that subpixel's storage capacitor before applying the desired data voltage. Methods such as this compensate for $V_{th}$ shift, but they cannot compensate for $V_{oled}$ rise or OLED efficiency loss. These methods require increased subpixel complexity and increased subpixel electronics size compared to the conventional 2T1C voltage-drive subpixel circuit. Increased subpixel complexity reduces yield, because the finer features required are more vulnerable to fabrication errors. Particularly in typical bottom-emitting configurations, increased total size of the subpixel electronics increases power consumption because it reduces the aperture ratio, the percentage of the subpixel which emits light. Light emission of an OLED is proportional to area at a fixed current, so an OLED emitter with a smaller aperture ratio requires more current to produce the same luminance as an OLED with a larger aperture ratio. Additionally, higher currents in smaller areas increase current density in the OLED emitter, which accelerates $V_{oled}$ rise and OLED efficiency loss.

In-pixel measurement $V_{th}$ compensation schemes add additional circuitry to each subpixel to allow values representative of $V_{th}$ shift to be measured. Off-panel circuitry then processes the measurements and adjusts the drive of each subpixel to compensate for $V_{th}$ shift. For example, Nathan et al., in U.S. Patent Application Publication No. 2006/0273997, teach a four-transistor pixel circuit which allows TFT degradation data to be measured as either current under given voltage conditions or voltage under given current conditions. Nara et al., in U.S. Pat. No. 7,199,602, teach adding a switching transistor to the subpixel to connect it to an inspection interconnect. Kimura et al., in U.S. Pat. No. 6,518,962, teach adding correction TFTs to the subpixel to compensate for EL degradation. These methods share the disadvantages of in-pixel $V_{th}$ compensation schemes, but some can additionally compensate for $V_{oled}$ shift or OLED efficiency loss.

In-pixel measurement $V_{th}$ compensation schemes add circuitry around a panel to take and process measurements without modifying the design of the panel. For example, Naugler et al., in U.S. Patent Application Publication No. 2008/0048951, teach measuring the current through an OLED emitter at various gate voltages of a drive transistor to locate a point on precalculated lookup tables used for compensation. However, this method requires a large number of lookup tables, consuming a significant amount of memory. Further, this method does not recognize the problem of integrating compensation with image processing typically performed in display drive electronics.

Reverse-bias $V_{th}$ compensation schemes use some form of reverse voltage bias to shift $V_{th}$ back to some starting point. These methods cannot compensate for $V_{oled}$ rise or OLED efficiency loss. For example, Lo et al., in U.S. Pat. No. 7,116,058, teach modulating the reference voltage of the storage capacitor in an active-matrix pixel circuit to reverse-bias the drive transistor between each frame. Applying reverse-bias within or between frames prevents visible artifacts, but reduces duty cycle and thus peak brightness. Reverse-bias methods can compensate for the average $V_{th}$ shift of the panel with less increase in power consumption than in-pixel compensation methods, but they require more complicated external power supplies, can require additional pixel circuitry or signal lines, and may not compensate individual subpixels that are more heavily faded than others.

Considering $V_{oled}$ shift and OLED efficiency loss, U.S. Pat. No. 6,995,519 by Arnold et al. is one example of a method that compensates for aging of an OLED emitter. This method assumes that the entire change in emitter luminance is caused by changes in the OLED emitter. However, when the drive transistors in the circuit are formed from a-Si, this assumption is not valid, as the threshold voltage of the transistors also changes with use. The method of Arnold will thus not provide complete compensation for subpixel aging in circuits wherein transistors show aging effects. Additionally, when methods such as reverse bias are used to mitigate a-Si transistor threshold voltage shifts, compensation of OLED efficiency loss can become unreliable without appropriate tracking/prediction of reverse bias effects, or a direct measurement of the OLED voltage change or transistor threshold voltage change.

Alternative methods for compensation measure the light output of the subpixel directly, as taught e.g. by Young et al. in U.S. Pat. No. 6,489,631. Such methods can compensate for changes in all three aging factors, but require either a very high-precision external light sensor, or an integrated light sensors in the subpixel. An external light sensor adds to the cost and complexity of a device, while integrated light sensors increase subpixel complexity and electronics size, with attendant performance reductions.

There is a continuing need, therefore, for improving compensation to overcome these objections to compensate for EL subpixel degradation.

SUMMARY OF THE INVENTION

In accordance with the present invention, there is provided apparatus for providing a drive transistor control signal to a gate electrode of a drive transistor in an electroluminescent (EL) subpixel, comprising:

(a) the electroluminescent (EL) subpixel having an EL emitter with a first and second electrode, and having the drive transistor with a first supply electrode, a second supply electrode, and the gate electrode, wherein the second supply electrode of the drive transistor is electrically connected to the first electrode of the EL emitter for applying current to the EL emitter;

(b) a first voltage supply electrically connected to the first supply electrode of the drive transistor;

(c) a second voltage supply electrically connected to the second electrode of the EL emitter;

(d) a test voltage source electrically connected to the gate electrode of the drive transistor;

(e) a voltage controller for controlling voltages of the first voltage supply, second voltage supply and test voltage source to operate the drive transistor in a linear region;

(f) a measuring circuit for measuring the current passing through the first and second supply electrodes of the drive transistor at different times to provide a status signal representing variations in the characteristics of the drive transistor and EL emitter caused by operation of the drive transistor and EL emitter over time, wherein the current is measured while the drive transistor is operated in the linear region;

(g) means for providing a linear code value;

(h) a compensator for changing the linear code value in response to the status signal to compensate for the variations in the characteristics of the drive transistor and EL emitter; and (i) a source driver for producing the drive transistor control signal in response to the changed linear code value for driving the gate electrode of the drive transistor.

The present invention provides an effective way of providing the drive transistor control signal. It requires only one measurement to perform compensation. It can be applied to any active-matrix subpixel. The compensation of the control signal has been simplified by using a look-up table (LUT) to change signals from nonlinear to linear so compensation can be in linear voltage domain. It compensates for $V_{th}$ shift, $V_{oled}$ shift, and OLED efficiency loss without requiring complex pixel circuitry or external measurement devices. It does not decrease the aperture ratio of a subpixel. It has no effect on the normal operation of the subpixel. Improved S/N (signal/noise) is obtained by taking measurements of the characteristics of the EL subpixel while operating in the linear region of transistor operation.

DETAILED DESCRIPTION OF THE INVENTION

The present invention compensates for degradation in the drive transistors and electroluminescent (EL) emitters of an EL subpixel, such as an organic light-emitting diode (OLED) subpixel. In one embodiment, it compensates for $V_{th}$ shift, $V_{oled}$ shift, and OLED efficiency loss of all subpixels on an active-matrix OLED panel.

The discussion to follow first considers the system as a whole. It then proceeds to the electrical details of a subpixel, followed by the electrical details for measuring the subpixel. It next covers how the compensator uses measurements. Finally, it describes how this system is implemented in one embodiment, e.g. in a consumer product, from the factory to end-of-life.

Overview

Figure 1:
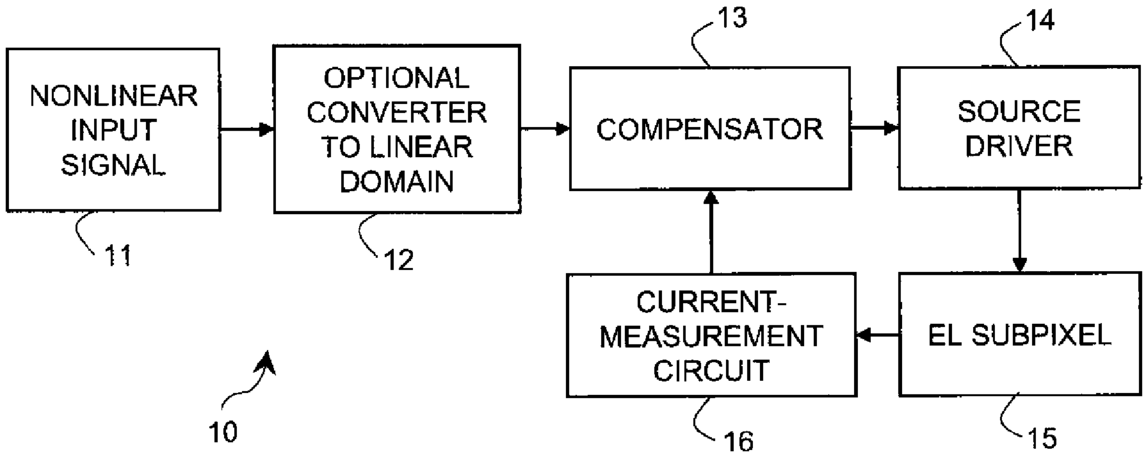
FIG. 1 is a block diagram of a display system for practicing the present invention.

FIG. 1 shows a block diagram of a system 10 of the present invention. A nonlinear input signal 11 commands a particular light intensity from an EL emitter in an EL subpixel. This signal 11 can come from a video decoder, an image processing path, or another signal source, can be digital or analog, and can be nonlinearly- or linearly-coded. For example, the nonlinear input signal can be an sRGB code value (IEC 61966-2-1:1999+A1) or an NTSC luma voltage. Whatever the source and format, the signal can preferentially be converted into a digital form and into a linear domain, such as linear voltage, by a converter 12, which will be discussed further in "Cross-domain processing, and bit depth", below. The result of the conversion will be a linear code value, which can represent a commanded drive voltage.

A compensator 13 receives the linear code value, which can correspond to the particular light intensity commanded from the EL subpixel. As a result of variations in the drive transistor and EL emitter caused by mura and by operation of the drive transistor and EL emitter in the EL subpixel over time, the EL subpixel will generally not produce the commanded light intensity in response to the linear code value. The compensator 13 outputs a changed linear code value that will cause the EL subpixel to produce the commanded intensity, thereby compensating for variations in the characteristics of the drive transistor and EL emitter caused by operation of the drive transistor and EL emitter over time, and for variations in the characteristics of the drive transistor and EL emitter from subpixel to subpixel. The operation of the compensator will be discussed further in "Implementation," below.

The changed linear code value from the compensator 13 is passed to a source driver 14 which can be a digital-to-analog converter. The source driver 14 produces a drive transistor control signal, which can be an analog voltage or current, or a digital signal such as a pulse-width-modulated waveform, in response to the changed linear code value. In a preferred embodiment, the source driver 14 can be a source driver having a linear input-output relationship, or a conventional LCD or OLED source driver with its gamma voltages set to produce an approximately linear output. In the latter case, any deviations from linearity will affect the quality of the results. The source driver 14 can also be a time-division (digital-drive) source driver, as taught e.g. in commonly assigned WO 2005/116971 by Kawabe. The analog voltage from a digital-drive source driver is set at a predetermined level commanding light output for an amount of time dependent on the output signal from the compensator. A conventional source driver, by contrast, provides an analog voltage at a level dependent on the output signal from the compensator for a fixed amount of time (generally the entire frame). A source driver can output one or more drive transistor control signals simultaneously. A panel preferably has a plurality of source drivers, each outputting the drive transistor control signal for one subpixel at a time.

The drive transistor control signal produced by the source driver 14 is provided to an EL subpixel 15. This circuit, as will be discussed in "Display element description," below. When the analog voltage is provided to the gate electrode of the drive transistor in the EL subpixel 15, current flows through the drive transistor and EL emitter, causing the EL emitter to emit light. There is generally a linear relationship between current through the EL emitter and luminance of the light output of the emitter, and a nonlinear relationship between voltage applied to the drive transistor and current through the EL emitter. The total amount of light emitted by an EL emitter during a frame can thus be a nonlinear function of the voltage from the source driver 14.

The current flowing through the EL subpixel is measured under specific drive conditions by a current-measurement circuit 16, as will be discussed further in "Data collection," below. The measured current for the EL subpixel provides the compensator with the information it needs to adjust the commanded drive signal. This will be discussed further in "Algorithm," below.

Display Element Description

Figure 9:
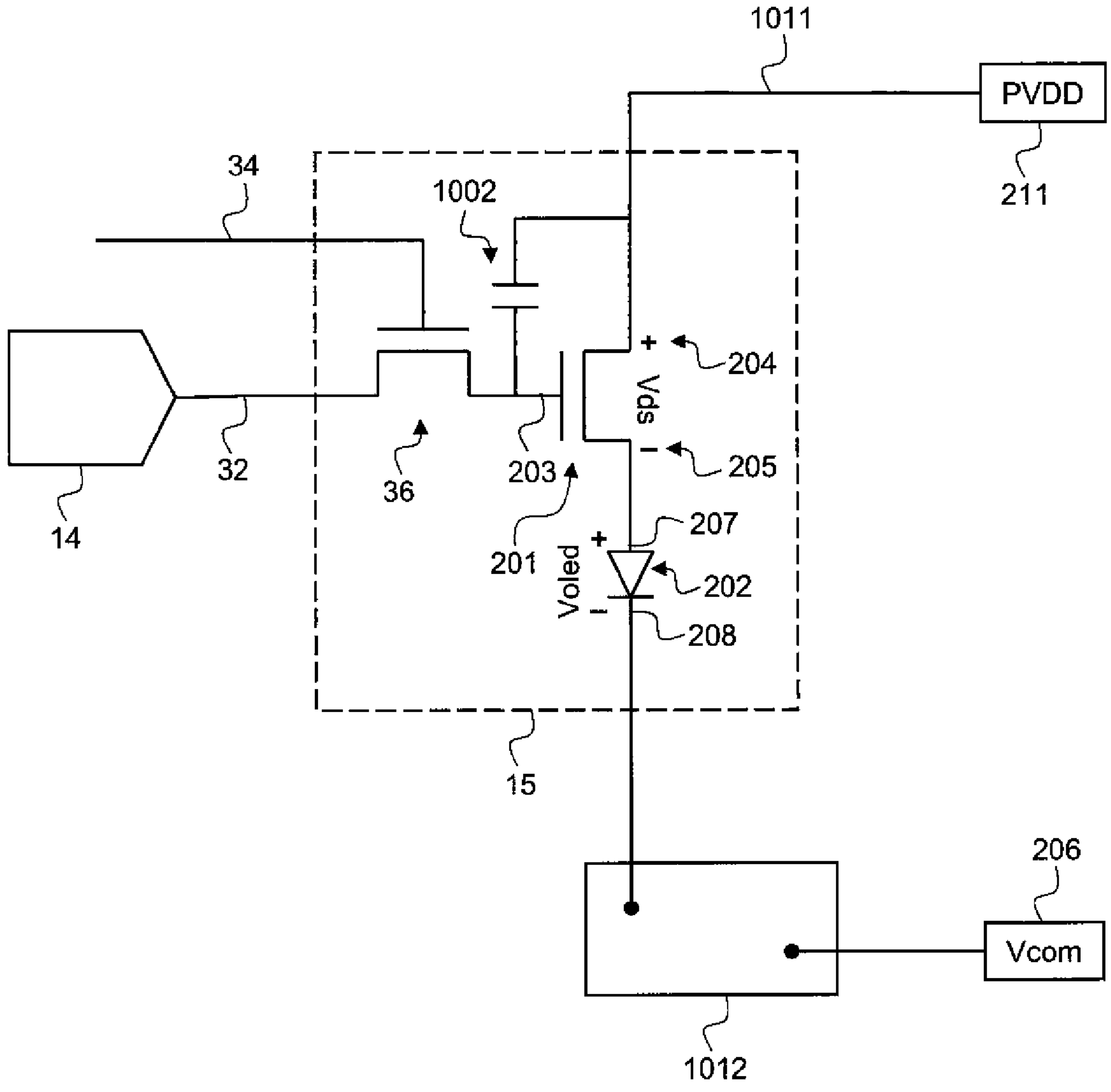
FIG. 9 is a detailed schematic of a subpixel according to the present invention.

FIG. 9 shows an EL subpixel 15 that applies current to an EL emitter, such as an OLED emitter, and associated circuitry. EL subpixel 15 includes a drive transistor 201, an EL emitter 202, and optionally a storage capacitor 1002 and a select transistor 36. A first voltage supply 211 ("PVDD") can be positive, and a second voltage supply 206 ("Vcom") can be negative. The EL emitter 202 has a first electrode 207 and a second electrode 208. The drive transistor has a gate electrode 203, a first supply electrode 204 which can be the drain of the drive transistor, and a second supply electrode 205 which can be the source of the drive transistor. A drive transistor control signal can be provided to the gate electrode 203, optionally through a select transistor 36. The drive transistor control signal can be stored in storage capacitor 1002. The first supply electrode 204 is electrically connected to the first voltage supply 211. The second supply electrode 205 is electrically connected to the first electrode 207 of the EL emitter 202 to apply current to the EL emitter. The second electrode 208 of the EL emitter is electrically connected to the second voltage supply 206. The voltage supplies are typically located off the EL panel. Electrical connection can be made through switches, bus lines, conducting transistors, or other devices or structures capable of providing a path for current.

In one embodiment of the present invention, first supply electrode 204 is electrically connected to first voltage supply 211 through a PVDD bus line 1011, second electrode 208 is electrically connected to second voltage supply 206 through a sheet cathode 1012, and the drive transistor control signal is provided to gate electrode 203 by a source driver 14 across a column line 32 when select transistor 36 is activated by a gate line 34.

Figure 2:
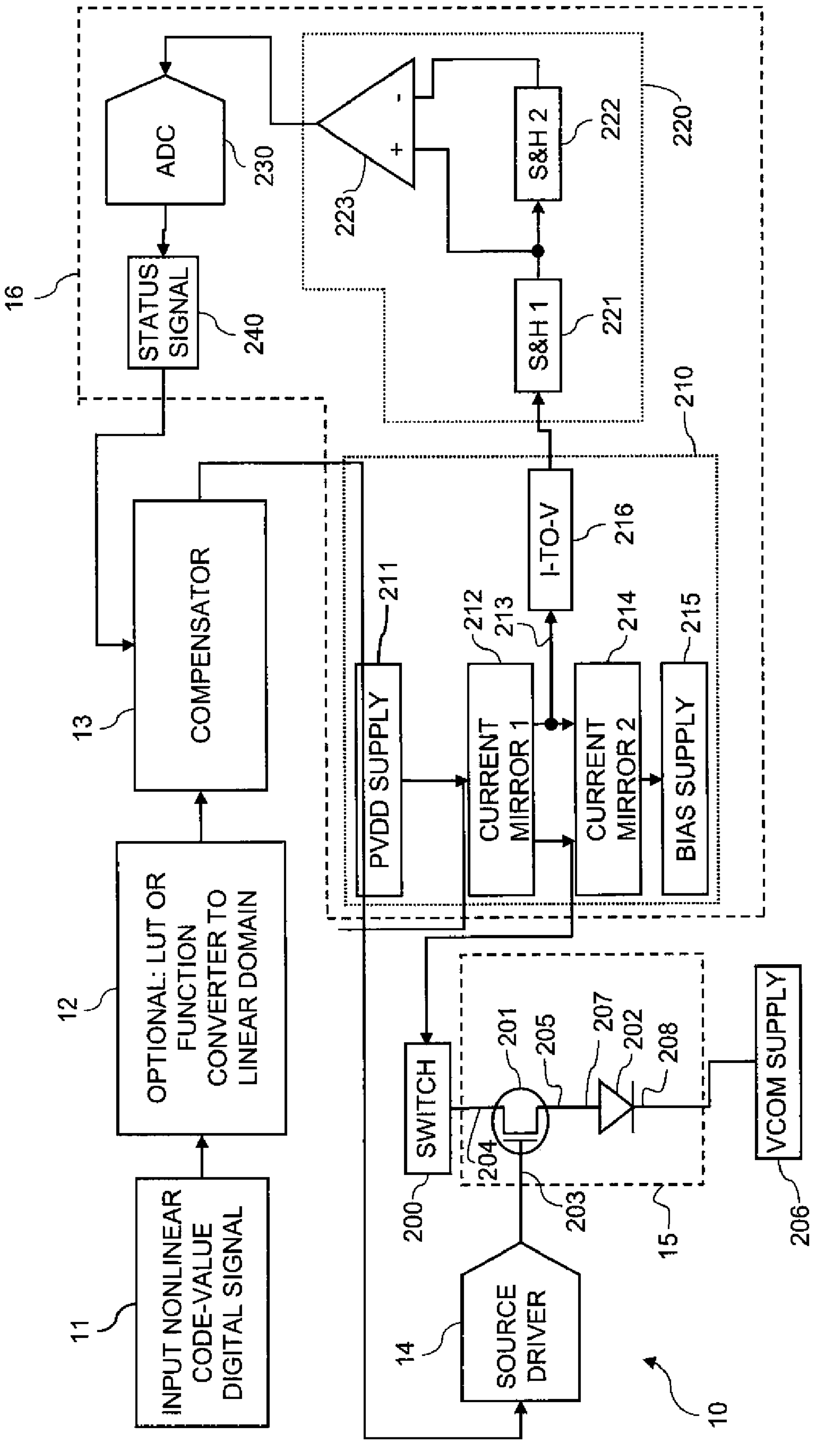
FIG. 2 is a schematic of a detailed version of the block diagram of FIG. 1.

FIG. 2 shows the EL subpixel 15 in the context of the system 10, including nonlinear input signal 11, converter 12, compensator 13, and source driver 14 as shown in FIG. 1. As described above, the drive transistor 201 has gate electrode 203, first supply electrode 204 and second supply electrode 205. The EL emitter 202 has first electrode 207 and second electrode 208. The system has voltage supplies 211 and 206.

Neglecting leakage, the same current, the drive current, passes from first voltage supply 211, through the first supply electrode 204 and the second supply electrode 205, through the EL emitter electrodes 207 and 208, to the second voltage supply 206. The drive current is what causes the EL emitter to emit light. Therefore, current can be measured at any point in this drive current path. Current can be measured off the EL panel at the first voltage supply 211 to reduce the complexity of the EL subpixel. Drive current is referred to herein as $I_{ds}$, the current through the drain and source terminals of the drive transistor.

Data Collection

Hardware

Still referring to FIG. 2, to measure the current of the EL subpixel 15 without relying on any special electronics on the panel, the present invention employs a measuring circuit 16 including a current mirror unit 210, a correlated double-sampling (CDS) unit 220, and optionally an analog-to-digital converter (ADC) 230 and a status signal generation unit 240.

The EL subpixel 15 is measured at a current corresponding to a measurement reference gate voltage (FIG. 4A 510) on the gate electrode 203 of drive transistor 201. To produce this voltage, when taking measurements, source driver 14 acts as a test voltage source and provides the measurement reference gate voltage to gate electrode 203. Measurements can be advantageously kept invisible to the user by selecting a measurement reference gate voltage which corresponds to a measured current which is less than a selected threshold current. The selected threshold current can be chosen to be less than that required to emit appreciable light from an EL emitter, e.g. 1.0 nit or less. Since measured current is not known until the measurement is taken, the measurement reference gate voltage can be selected by modelling to correspond to an expected current which is a selected headroom percentage below the selected threshold current.

The current mirror unit 210 is attached to voltage supply 211, although it can be attached anywhere in the drive current path. A first current mirror 212 supplies drive current to the EL subpixel 15 through a switch 200, and produces a mirrored current on its output 213. The mirrored current can be equal to the drive current, or a function of the drive current. For example, the mirrored current can be a multiple of the drive current to provide additional measurement-system gain. A second current mirror 214 and a bias supply 215 apply a bias current to the first current mirror 212 to reduce the impedance of the first current mirror viewed from the panel, advantageously increasing the response speed of the measurement circuit. This circuit also reduces changes in the current through the EL subpixel being measured due to voltage changes in the current mirror resulting from current draw of the measurement circuit. This advantageously improves signal-to-noise ratio over other current-measurement options, such as a simple sense resistor, which can change voltages at the drive transistor terminals depending on current. Finally, a current-to-voltage (I-to-V) converter 216 converts the mirrored current from the first current mirror into a voltage signal for further processing. The I-to-V converter 216 can include a transimpedance amplifier or a low-pass filter.

Switch 200, which can be a relay or FET, can selectively electrically connect the measuring circuit to the drive current flow through the first and second electrodes of the drive transistor 201. During measurement, the switch 200 can electrically connect first voltage supply 211 to first current mirror 212 to permit measurements. During normal operation, the switch 200 can electrically connect first voltage supply 211 directly to first supply electrode 204 rather than to first current mirror 212, thus removing the measuring circuit from the drive current flow. This causes the measurement circuitry to have no effect on normal operation of the panel. It also advantageously permits the measurement circuit's components, such as the transistors in the current mirrors 212 and 214, to be sized only for measurement currents and not for operational currents. As normal operation generally draws much more current than measurement, this permits substantial reduction in the size and cost of the measurement circuit.

Sampling

The current mirror unit 210 permits measurement of the current for one EL subpixel at a single point in time. To improve signal-to-noise ratio, in one embodiment the present invention uses correlated double-sampling.

Figure 3:
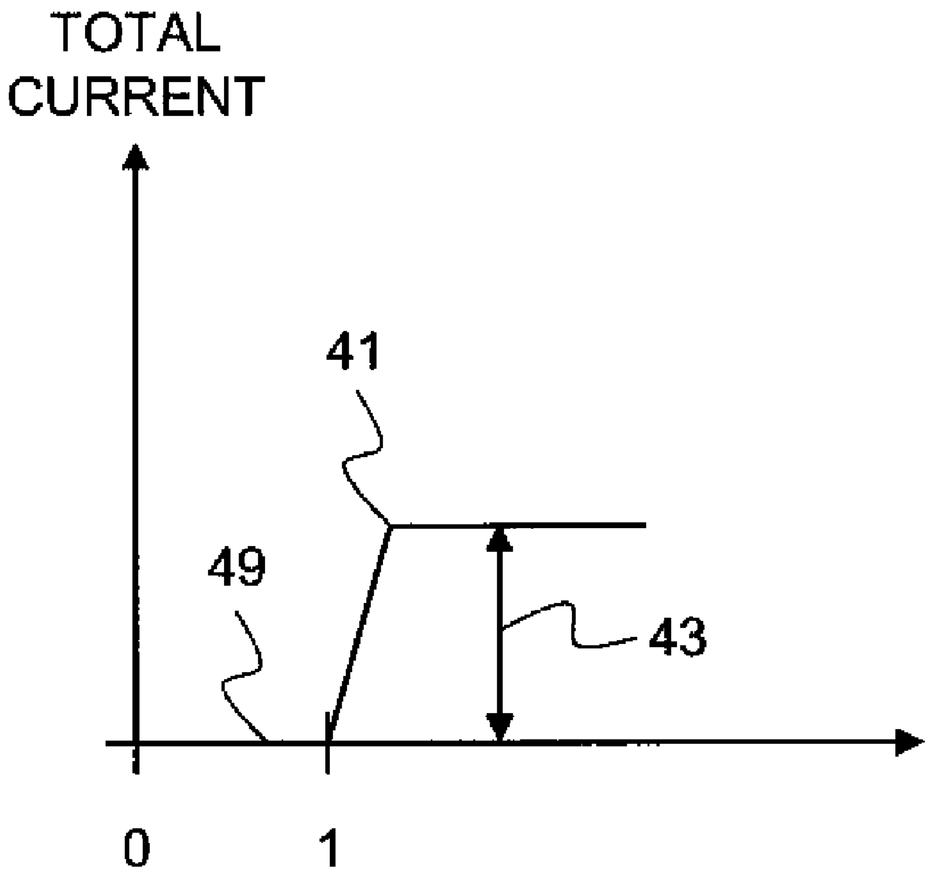
FIG. 3 is a timing diagram for operating the measurement circuit of FIG. 2.

Referring now to FIG. 3, and also to FIG. 2, a measurement 49 is taken when the EL subpixel 15 is off. It is thus drawing a dark current, which can be zero or only a leakage amount. If the dark current is nonzero, it can preferably be deconfounded with the measurement of the current of the EL subpixel 15. At time 1, the EL subpixel 15 is activated and its current 41 measured with measuring circuit 16. Specifically, what is measured is the voltage signal from the current-mirror unit 210, which represents the drive current $I_{ds}$ through the first and second voltage supplies as discussed above; measuring the voltage signal representing current is referred to as "measuring current" for clarity. Current 41 is the sum of the current from the first subpixel and the dark current. A difference 43 between the first measurement 41 and the dark-current measurement 49 is the current drawn by the second subpixel. This method permits measurements to be taken as fast as the settling time of a subpixel will permit.

Referring back to FIG. 2, and also to FIG. 3, correlated double-sampling unit 220 samples the measured currents to produce status signals. In hardware, currents are measured by latching their corresponding voltage signals from current mirror unit 210 into sample-and-hold units 221 and 222 of FIG. 2. The voltage signals can be those produced by I-to-V converter 216. A differential amplifier 223 takes the differences between successive subpixel measurements. The output of sample-and-hold unit 221 is electrically connected to the positive terminal of differential amplifier 223 and the output of unit 222 is electrically connected to the negative terminal of amplifier 223. For example, when current 49 is measured, the measurement is latched into sample-and-hold unit 221. Then, before current 41 is measured (latched into unit 221), the output of unit 221 is latched into second sample-and-hold unit 222. Current 41 is then measured. This leaves current 49 in unit 222 and current 41 in unit 221. The output of the differential amplifier, the value in unit 221 minus the value in unit 222, is thus (the voltage signal representing) current 41 minus (the voltage signal representing) current 49, or difference 43. Measurements can successively be taken at a variety of drive levels (gate voltages or current densities) to form I-V curves for the subpixel.

The analog or digital output of differential amplifier 223 can be provided directly to compensator 13. Alternatively, analog-to-digital converter 230 can preferably digitize the output of differential amplifier 223 to provide digital measurement data to compensator 13.

The measuring circuit 16 can preferably include a status signal generation unit 240 which receives the output of differential amplifier 223 and performs further processing to provide the status signal for the EL subpixel. Status signals can be digital or analog. Referring to FIG. 5B, status signal generation unit 240 is shown in the context of compensator 13 for clarity. In various embodiments, status signal generation unit 240 can include a memory 619 for holding data about the subpixel.

In a first embodiment of the present invention, the current difference, e.g. 43, can be the status signal for a corresponding subpixel. In this embodiment the status signal generation unit 240 can perform a linear transform on current difference, or pass it through unmodified. The current through the subpixel (43) at the measurement reference gate voltage depends on, and thus meaningfully represents, the characteristics of the drive transistor and EL emitter in the subpixel. The current difference 43 can be stored in memory 619.

In a second embodiment, memory 619 stores a target signal $i_0$ 611 for the EL subpixel 15. Memory 619 also stores a most recent current measurement $i_1$ 612 of the EL subpixel, which can be the value most recently measured by the measurement circuit for the subpixel. Measurement 612 can also be an average of a number of measurements, an exponentially-weighted moving average of measurements over time, or the result of other smoothing methods which will be obvious to those skilled in the art. Target signal $i_0$ 611 and current measurement $i_1$ 612 can be compared as described below to provide a percent current 613, which can be the status signal for the EL subpixel. The target signal for the subpixel can be a current measurement of the subpixel and thus percent current can represent variations in the characteristics of the drive transistor and EL emitter caused by operation of the drive transistor and EL emitter over time.

Memory 619 can include RAM, nonvolatile RAM, such as a Flash memory, and ROM, such as EEPROM. In one embodiment, the $i_0$ value is stored in EEPROM and the $i_1$ value is stored in Flash.

Sources of Noise

In practice, the current waveform can be other than a clean step, so measurements can be taken only after waiting for the waveform to settle. Multiple measurements of each subpixel can also be taken and averaged together. Such measurements can be taken consecutively, or in separate measurement passes. Capacitance between voltage supplies 206 and 211 can add to the settling time. This capacitance can be intrinsic to the panel or provided by external capacitors, as is common in normal operation. It can be advantageous to provide a switch that can be used to electrically disconnect the external capacitors while taking measurements.

Noise on any voltage supply will affect the current measurement. For example, noise on the voltage supply which the gate driver uses to deactivate rows (often called VGL or Voff, and typically around −8 VDC) can capacitively couple across the select transistor into the drive transistor and affect the current, thus making current measurements noisier. If a panel has multiple power-supply regions, for example a split supply plane, those regions can be measured in parallel. Such measurement can isolate noise between regions and reduce measurement time.

Whenever the source driver switches, its noise transients can couple into the voltage supply planes and the individual subpixels, causing measurement noise. To reduce this noise, the control signals out of the source driver can be held constant. This will eliminate source-driver transient noise.

Current Stability

This discussion so far assumes that once the subpixel is turned on and settles to some current, it remains at that current for the remainder of the column. Two effects that can violate that assumption are storage-capacitor leaking and within-subpixel effects.

Referring to FIG. 9, leakage current of select transistor 36 in subpixel 15 can gradually bleed off charge on storage capacitor 1002, changing the gate voltage of drive transistor 201 and thus the current drawn. Additionally, if column line 32 is changing value over time, it has an AC component, and therefore can couple through the parasitic capacitances of the select transistor onto the storage capacitor, changing the storage capacitor's value and thus the current drawn by the subpixel.

Even when the storage capacitor's value is stable, within-subpixel effects can corrupt measurements. A common within-subpixel effect is self-heating of the subpixel, which can change the current drawn by the subpixel over time. The drift mobility of an a-Si TFT is a function of temperature; increasing temperature increases mobility (Kagan & Andry, op. cit., sec. 2.2.2, pp. 42-43). As current flows through the drive transistor, power dissipation in the drive transistor and in the EL emitter will heat the subpixel, increasing the temperature of the transistor and thus its mobility. Additionally, heat lowers $V_{oled}$; in cases where the OLED is attached to the source terminal of the drive transistor, this can increase $V_{gs}$ of the drive transistor. These effects increase the amount of current flowing through the transistor. Under normal operation, self-heating can be a minor effect, as the panel can stabilize to an average temperature based on the average contents of the image it is displaying. However, when measuring subpixel currents, self-heating can corrupt measurements.

To correct for self-heating effects and any other within-subpixel effects producing similar noise signatures, the self-heating can be characterized and subtracted off the known self-heating component of each subpixel.

Error due to self-heating, and power dissipation, can be reduced by selecting a lower measurement reference gate voltage (FIG. 4A 510), but a higher voltage improves signal-to-noise ratio. Measurement reference gate voltage can be selected for each panel design to balance these factors.

Algorithm

Figure 4A:
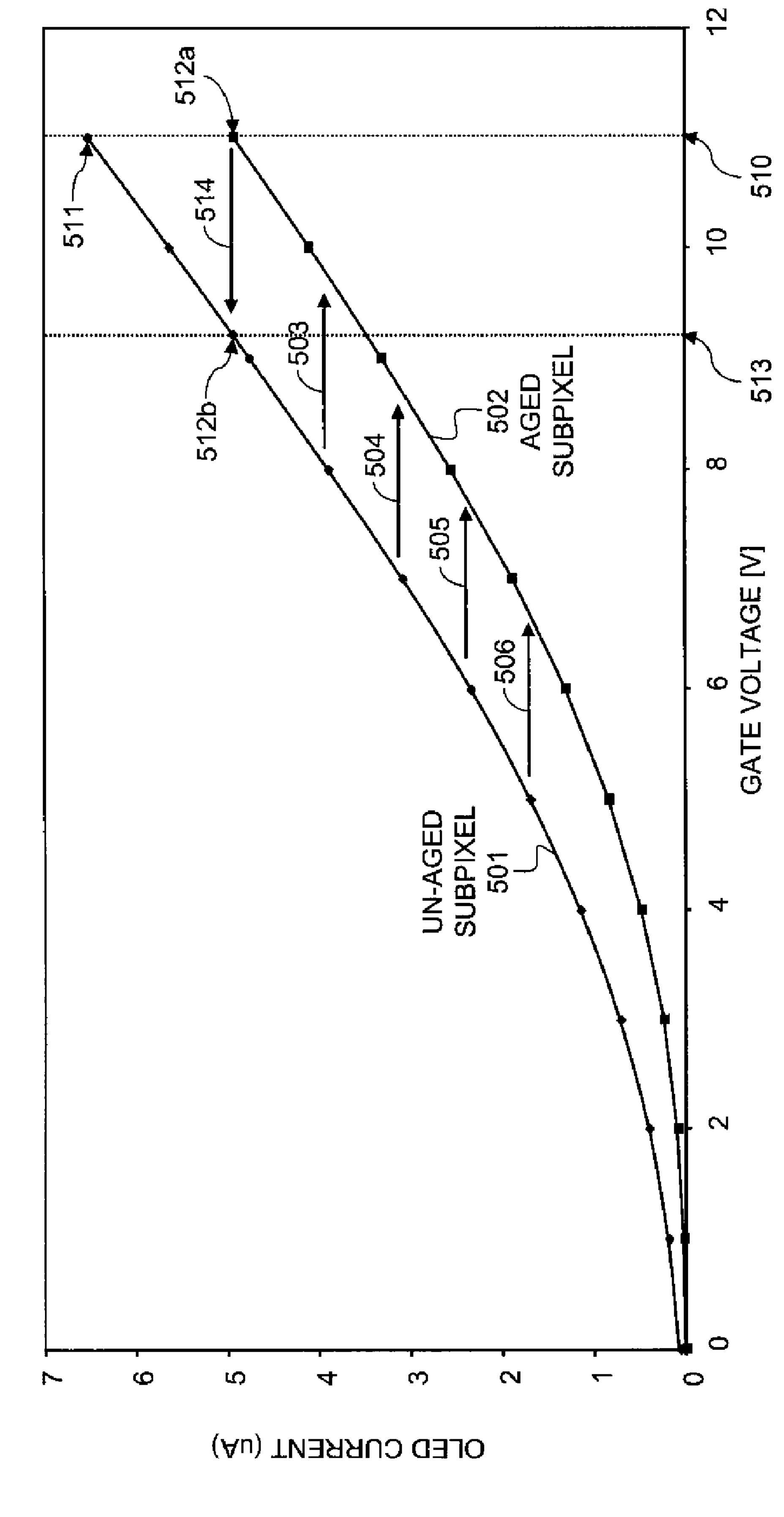
FIG. 4A is a representative I-V characteristic curve of un-aged and aged subpixels, showing $V_{th}$ shift.

Referring to FIG. 4A, I-V curve 501 is a measured characteristic of a subpixel before aging. I-V curve 502 is a measured characteristic of that subpixel after aging. Curves 501 and 502 are separated by what is largely a horizontal shift, as shown by identical voltage differences 503, 504, 505, and 506 at different current levels. That is, the primary effect of aging is to shift the I-V curve on the gate voltage axis by a constant amount. This is in keeping with the MOSFET saturation-region drive transistor equation, $I_d=K(V_{gs}-V_{th})^2$ (Lurch, N. *Fundamentals of electronics,* 2e. New York: John Wiley & Sons, 1971, pg. 110): the drive transistor is operated, $V_{th}$ increases; and as $V_{th}$ increases, $V_{gs}$ increases correspondingly to maintain $I_d$ constant. Therefore, constant $V_{gs}$ leads to lower $I_{ds}$ as $V_{th}$ increases.

At the measurement reference gate voltage 510, the unaged subpixel produced the current represented at point 511. The aged sub-pixel, however, produces at that gate voltage the lower amount of current represented at point 512*a*. Points 511 and 512*a* can be two measurements of the same subpixel taken at different times. For example, point 511 can be a measurement at manufacturing time, and point 512*a* can be a measurement after some use by a customer. The current represented at point 512*a* would have been produced by the un-aged subpixel when driven with voltage 513 (point 512*b*), so a voltage shift $\Delta V_{th}$ 514 is calculated as the voltage difference between voltages 510 and 513. Voltage shift 514 is thus the shift required to bring the aged curve back to the un-aged curve. In this example, $\Delta V_{th}$ 514 is just under two volts. Then, to compensate for the $V_{th}$ shift, and drive the aged subpixel to the same current as the un-aged subpixel had, voltage difference 514 is added to every commanded drive voltage (linear code value). For further processing, percent current is also calculated as current 512*a* divided by current 511. An unaged subpixel will thus have 100% current. Percent current is used in several algorithms according to the present invention. Any negative current reading 511, such as might be caused by extreme environmental noise, can be clipped to 0, or disregarded. Note that percent current is always calculated at the measurement reference gate voltage 510.

In general, the current of an aged subpixel can be higher or lower than that of an un-aged subpixel. For example, higher temperatures cause more current to flow, so a lightly-aged subpixel in a hot environment can draw more current than an unaged subpixel in a cold environment. The compensation algorithm of the present invention can handle either case; $\Delta V_{th}$ 514 can be positive or negative (or zero, for unaged pixels). Similarly, percent current can be greater or less than 100% (or exactly 100%, for unaged pixels).

Since the voltage difference due to $V_{th}$ shift is the same at all currents, any single point on the I-V curve can be measured to determine that difference. In one embodiment, measurements are taken at high gate voltages, advantageously increasing signal-to-noise ratio of the measurements, but any gate voltage on the curve can be used.

$V_{oled}$ shift is the secondary aging effect. As the EL emitter is operated, $V_{oled}$ shifts, causing the aged I-V curve to no longer be a simple shift of the un-aged curve. This is because $V_{oled}$ rises nonlinearly with current, so $V_{oled}$ shift will affect high currents differently than low currents. This effect causes the I-V curve to stretch horizontally as well as shifting. To compensate for $V_{oled}$ shift, two measurements at different drive levels can be taken to determine how much the curve has stretched, or the typical $V_{oled}$ shift of OLEDs under load can be characterized to permit estimation of $V_{oled}$ contribution in an open-loop manner. Both can produce acceptable results.

Figure 4B:
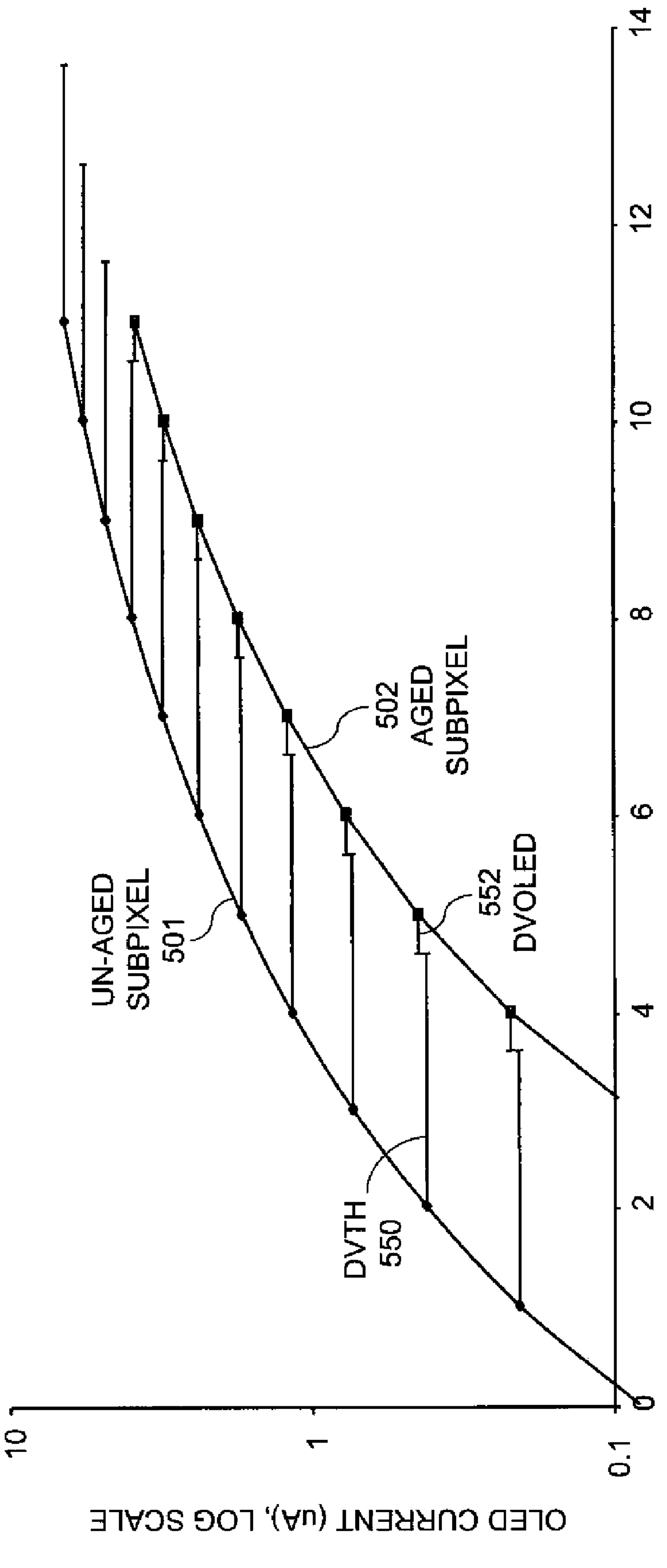
FIG. 4B is a representative I-V characteristic curve of un-aged and aged subpixels, showing $V_{th}$ and $V_{oled}$ shift.

Referring to FIG. 4B, an unaged-subpixel I-V curve 501 and an aged-subpixel I-V curve 502 are shown on a semilog scale. Components 550 are due to $V_{th}$ shift and components 552 are due to $V_{oled}$ shift. $V_{oled}$ shift can be characterized by driving an instrumented OLED subpixel with a typical input signal for a long period of time, and periodically measuring $V_{th}$ and $V_{oled}$. The two measurements can be made separately by providing a probe point on the instrumented subpixel between the OLED and the transistor. Using this characterization, percent current can be mapped to an appropriate $\Delta V_{th}$ and $\Delta V_{oled}$, rather than to a $V_{th}$ shift alone.

In one embodiment, the EL emitter 202 (FIG. 9) is connected to the source terminal of the drive transistor 201. Any change in $V_{oled}$ thus has a direct effect on $I_{ds}$, as it changes the voltage $V_s$ at the source terminal of the drive transistor and thus $V_{gs}$ of the drive transistor.

In a preferred embodiment, the EL emitter 202 is connected to the drain terminal of the drive transistor 201, for example, in PMOS non-inverted configurations, in which the OLED anode is tied to the drive transistor drain. $V_{oled}$ rise thus changes $V_{ds}$ of the drive transistor 201, as the OLED is connected in series with the drain-source path of the drive transistor. Modern OLED emitters, however, have much smaller $\Delta V_{oled}$ than older emitters for a given amount of aging, reducing the magnitude of $V_{ds}$ change and thus of $I_{ds}$ change.

Figure 10:
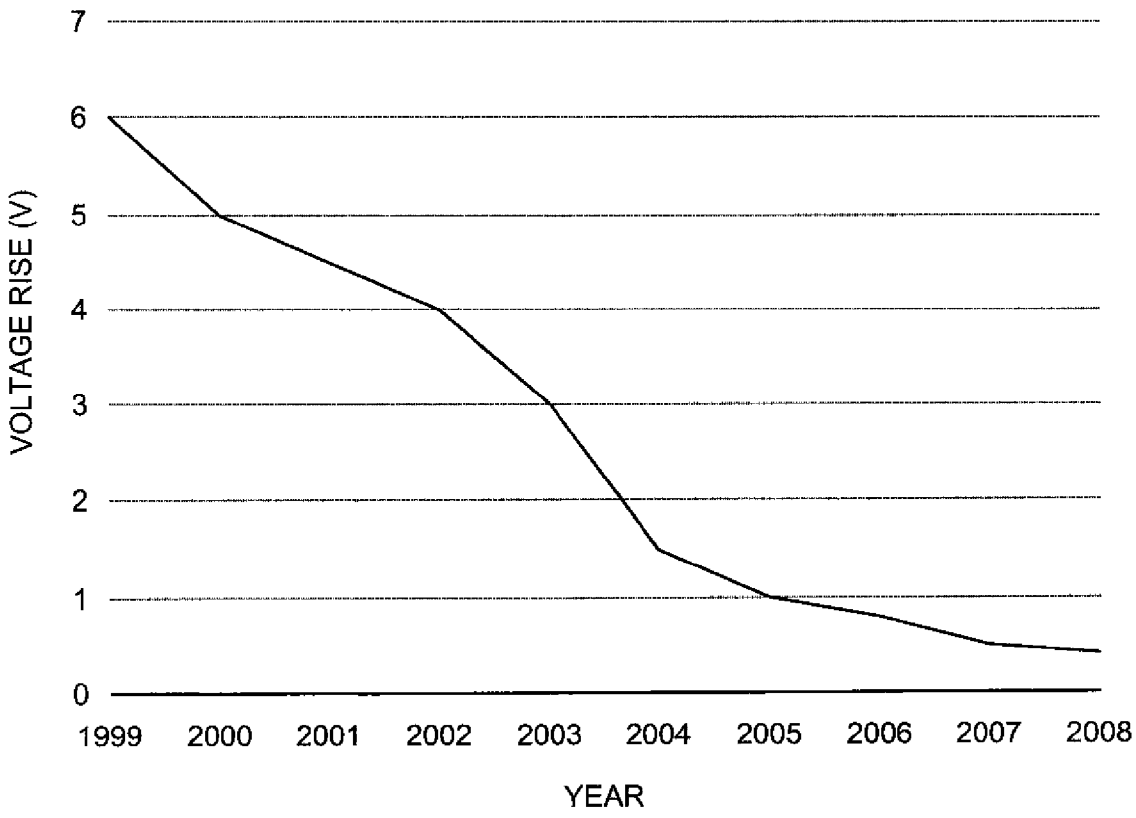
FIG. 10 is a plot of improvements in OLED voltage over time.

FIG. 10 shows a plot of the typical voltage rise $\Delta V_{oled}$ for a white OLED over its lifetime (until T50, 50% luminance, measured at 20 mA/cm$^2$). This plot shows the reduction in $\Delta V_{oled}$ as OLED technology has improved. This reduced $\Delta V_{oled}$ reduces $V_{ds}$ change. Referring to FIG. 4A, current 512*a* for an aged subpixel will be much closer to current 511 for a modern OLED emitter with a smaller $\Delta V_{oled}$ than it will for an older emitter with a larger $\Delta V_{oled}$. Therefore, much more sensitive current measurements can be required for modern OLED emitters than for older emitters. However, more sensitive measurement hardware can be expensive.

The requirement for extra measurement sensitivity can be mitigated by operating the drive transistor in the linear region of operation while taking current measurements. As is known in the electronics art, thin-film transistors conduct appreciable current in two different modes of operation: linear ($V_{ds}<V_{gs}-V_{th}$) and saturation ($V_{ds}>=V_{gs}-V_{th}$) (Lurch, op. cit., p. 111). In EL applications, the drive transistors are typically operated in the saturation region to reduce the effect of $V_{ds}$ variation on current. However, in the linear region of operation, where $$I_{ds}=K[2(V_{gs}-V_{th})V_{ds}-V_{ds}^2]$$

(Lurch, op. cit., pg. 112), the current $I_{ds}$ depends strongly on $V_{ds}$. Since $$V_{ds}=(PVDD-V_{com})-V_{oled}$$

as shown in FIG. 9, $I_{ds}$ in the linear region depends strongly on $V_{oled}$. Therefore, taking current measurements in the linear region of operation of drive transistor 201 advantageously increases the magnitude of change in measured current between a new OLED emitter (511) and an aged OLED emitter (512*a*) compared to taking the same measurement in the saturation region.

One embodiment of the present invention, therefore, includes a voltage controller. While measuring currents as described above, the voltage controller can control voltages for the first voltage supply 211 and second voltage supply 206, and the drive transistor control signal from source driver 14 operating as a test voltage source, to operate drive transistor 201 in the linear region. For example, in a PMOS non-inverted configuration, the voltage controller can hold the PVDD voltage and the drive transistor control signal at constant values and increase the Vcom voltage to reduce $V_{ds}$ without reducing $V_{gs}$. When $V_{ds}$ falls below $V_{gs}-V_{th}$, the drive transistor will be operating in the linear region and a measurement can be taken. The voltage controller can be included in the compensator. It can also be provided separately from the sequence controller as long as the two are coordinated to operate the transistors in the linear region during measurements.

OLED efficiency loss is the tertiary aging effect. As an OLED ages, its efficiency decreases, and the same amount of current no longer produces the same amount of light. To compensate for this without requiring optical sensors or additional electronics, OLED efficiency loss as a function of $V_{th}$ shift can be characterized, permitting estimation of the amount of extra current required to return the light output to its previous level. OLED efficiency loss can be characterized by driving an instrumented OLED subpixel with a typical input signal for a long period of time, and periodically measuring $V_{th}$, $V_{oled}$ and $I_{ds}$ at various drive levels. Efficiency can be calculated as $I_{ds}/V_{oled}$, and that calculation can be correlated to $V_{th}$ or percent current. Note that this characterization achieves most effective results when $V_{th}$ shift is always forward, since $V_{th}$ shift is readily reversible but OLED efficiency loss is not. If $V_{th}$ shift is reversed, correlating OLED efficiency loss with $V_{th}$ shift can become complicated. For further processing, percent efficiency can be calculated as aged efficiency divided by new efficiency, analogously to the calculation of percent current described above.

Figure 8:
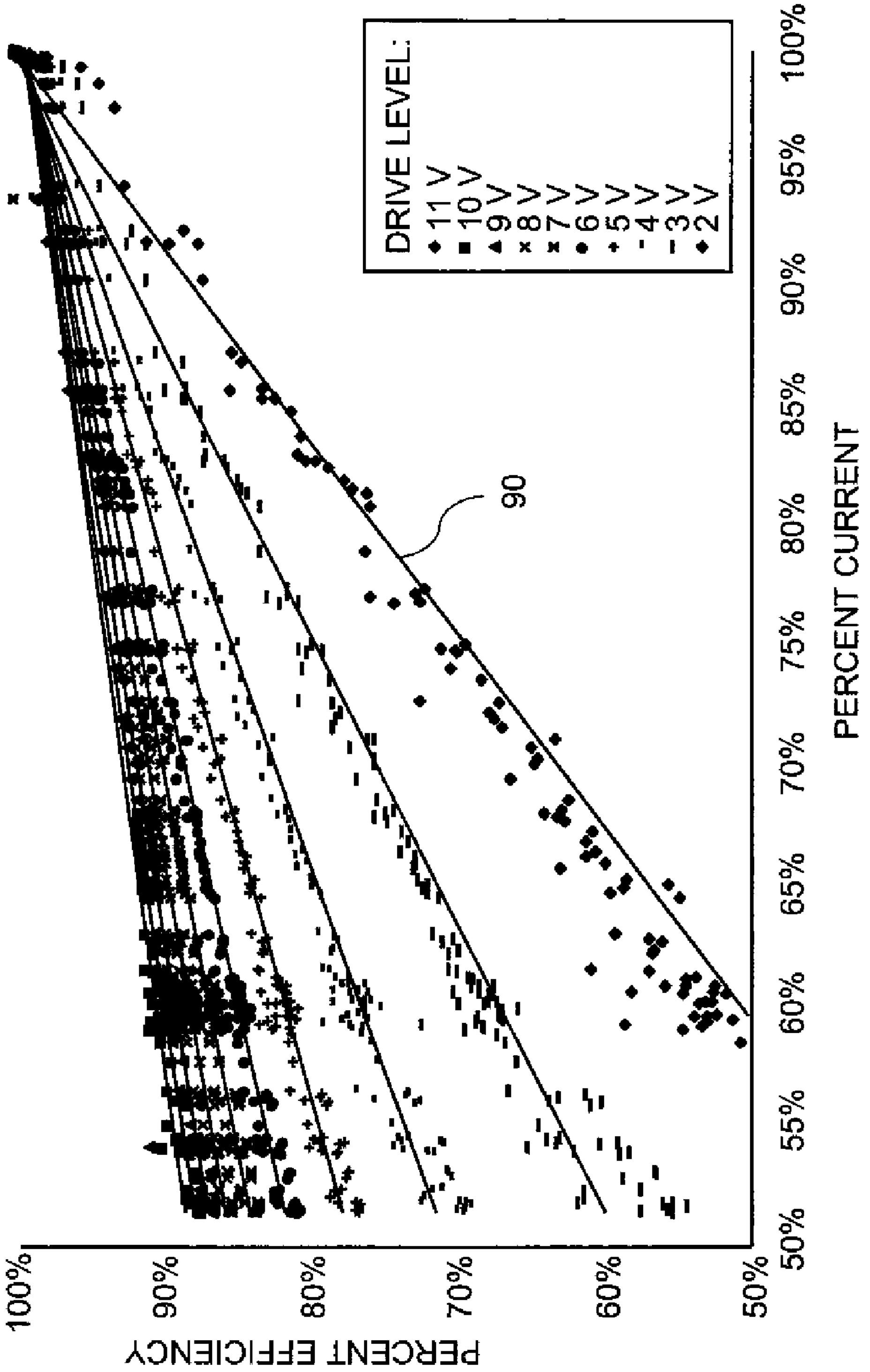
FIG. 8 is a representative plot showing percent efficiency as a function of percent current.

Referring to FIG. 8, there is shown an experimental plot of percent efficiency as a function of percent current at various drive levels, with linear fits e.g. 90 to the experimental data. As the plot shows, at any given drive level, efficiency is linearly related to percent current. This linear model permits effective open-loop efficiency compensation.

To compensate for $V_{th}$ and $V_{oled}$ shift and OLED efficiency loss due to operation of the drive transistor and EL emitter over time, the second above embodiment of the status signal generation unit 240 can be used. Subpixel currents can be measured at the measurement reference gate voltage 510. Un-aged current at point 511 is target signal $i_0$ 611. The most recent aged-subpixel current measurement 512*a* is most recent current measurement $i_1$ 612. Percent current 613 is the status signal. Percent current 613 can be 0 (dead pixel), 1 (no change), less than 1 (current loss) or greater than 1 (current gain). Generally it will be between 0 and 1, because the most recent current measurement will be lower than the target signal, which can preferably be a current measurement taken at panel manufacturing time.

Implementation

Figure 5A:
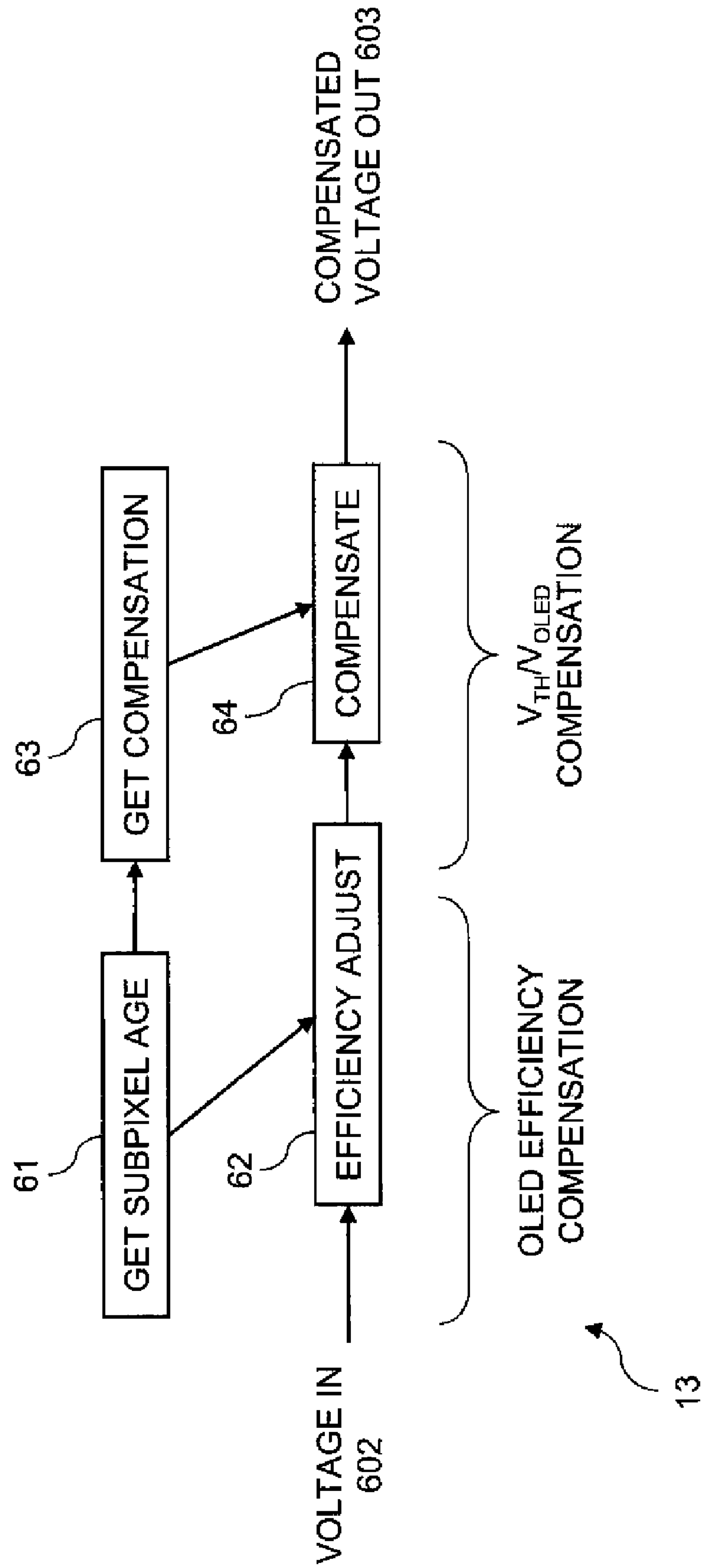
FIG. 5A is a high-level dataflow diagram of the compensator of FIG. 1.
Figure 5B:
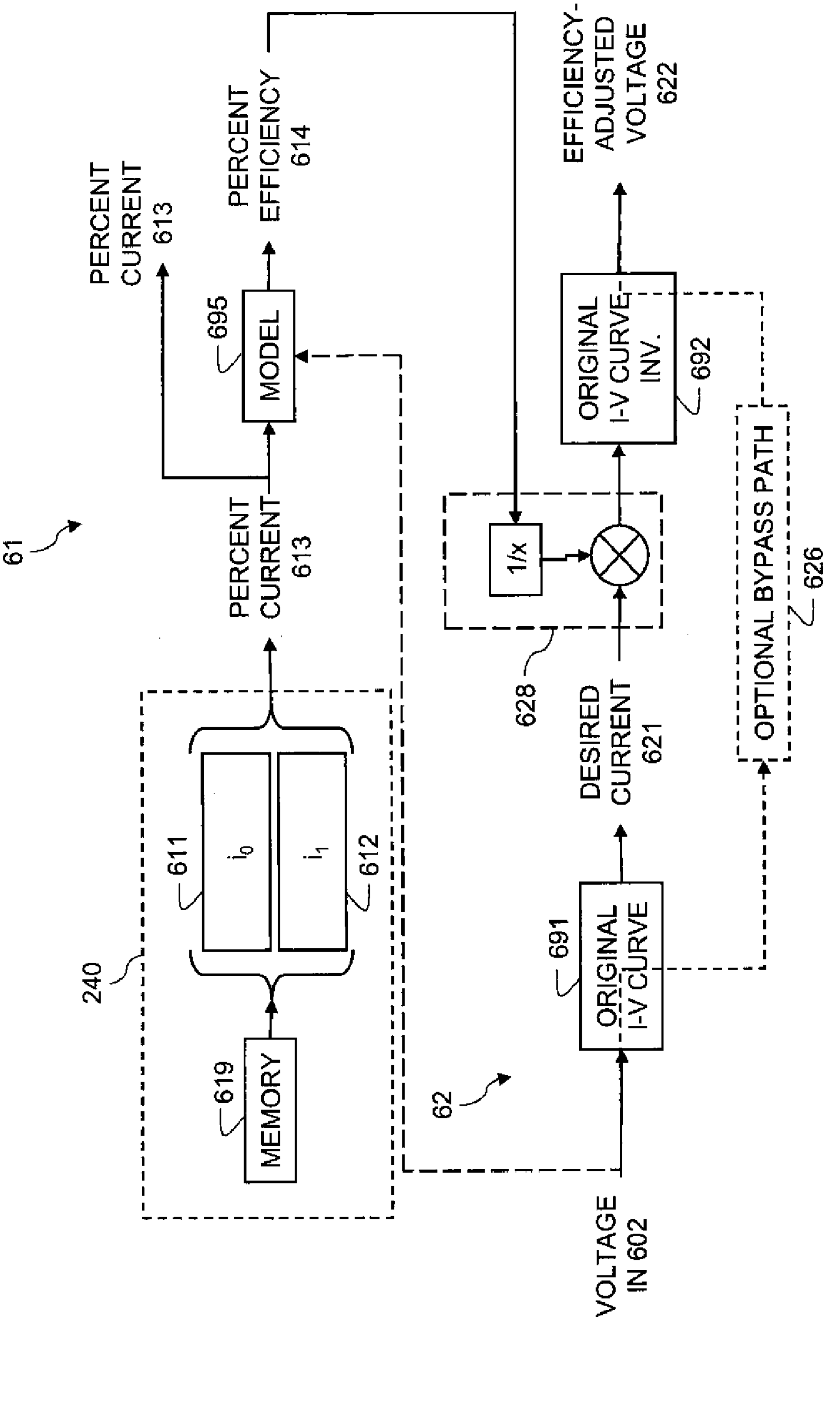
FIG. 5B is part one (of two) of a detailed dataflow diagram of the compensator.

Referring to FIG. 5A, there is shown an embodiment of a compensator 13. The input to compensator 13 is a linear code value 602, which can represent a commanded drive voltage for the EL subpixel 15. The compensator 13 changes the linear code value to produce a changed linear code value for a source driver, which can be e.g. a compensated voltage out 603. The compensator 13 can include four major blocks: determining a subpixel's age 61, optionally compensating for OLED efficiency 62, determining the compensation based on age 63, and compensating 64. Blocks 61 and 62 are primarily related to OLED efficiency compensation, and blocks 63 and 64 are primarily related to voltage compensation, specifically $V_{th}/V_{oled}$ compensation.

FIG. 5B is an expanded view of blocks 61 and 62. As described above, the stored target signal $i_0$ 611 and a stored most recent current measurement $i_1$ 612 are retrieved, and percent current 613, the status signal for the subpixel, calculated.

Percent current 613 is sent to the next processing stage 63, and is also input to a model 695 to determine the percent OLED efficiency 614. Model 695 outputs an efficiency 614 which is the amount of light emitted for a given current at the time of the most recent measurement, divided by the amount of light emitted for that current at manufacturing time. Any percent current greater than 1 can yield an efficiency of 1, or no loss, since efficiency loss can be difficult to calculate for pixels which have gained current. Model 695 can also be a function of the linear code value 602, as indicated by the dashed arrow, in cases where OLED efficiency depends on commanded current. Whether to include linear code value 602 as an input to model 695 can be determined by life testing and modeling of a panel design.

Figure 11:
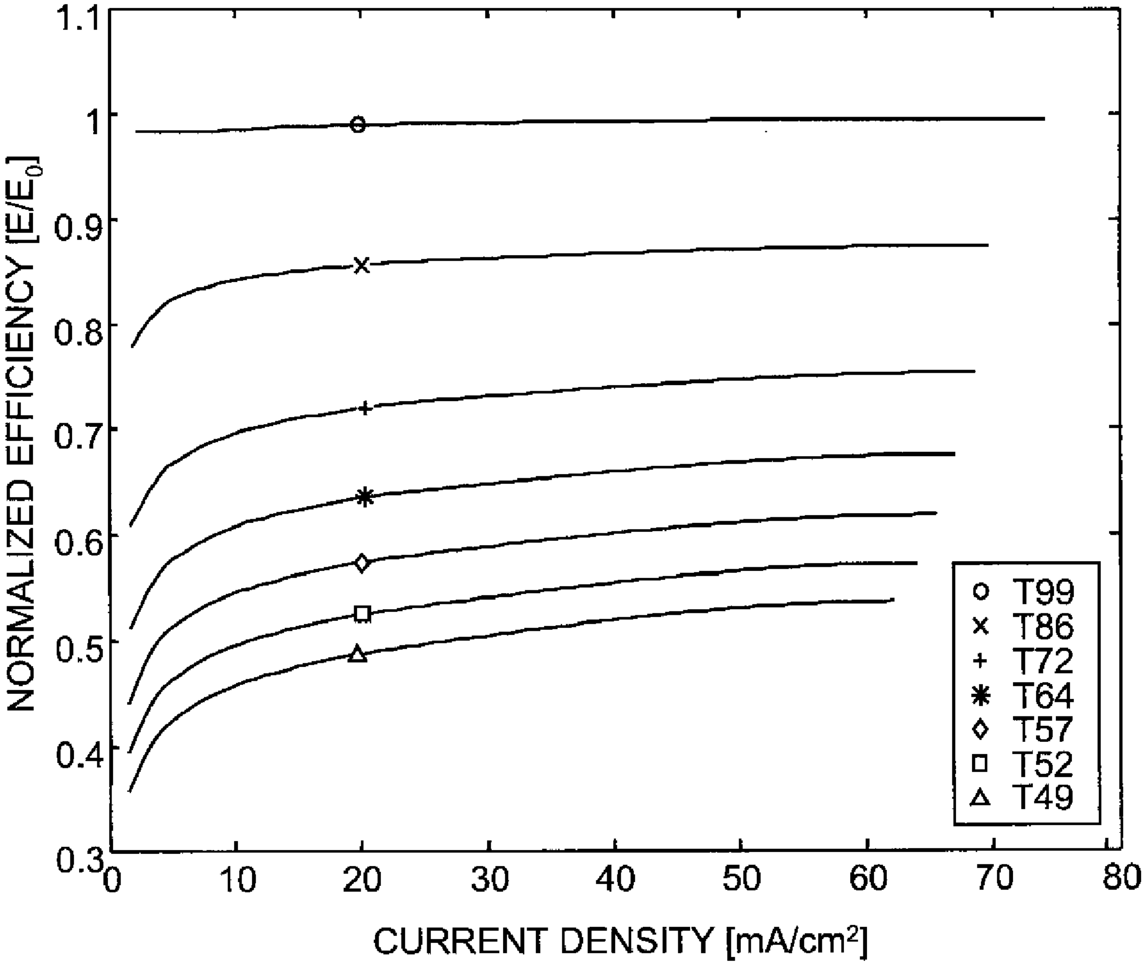
FIG. 11 is a graph showing the relationship between OLED efficiency, OLED age, and OLED drive current density.

Referring to FIG. 11, inventors have found that efficiency is generally a function of current density as well as of age. Each curve in FIG. 11 shows the relationship between current density, $I_{ds}$ divided by emitter area, and efficiency ($L_{oled}/I_{ds}$) for an OLED aged to a particular point. The ages are indicated in the legend using the T notation known in the art: e.g. T86 means 86% efficiency at a test current density of e.g. 20 $mA/cm^2$.

Referring back to FIG. 5B, model 695 can therefore include an exponential term (or some other implementation) to compensate for current density and age. Current density is linearly related to linear code value 602, which represents a commanded voltage. Therefore, the compensator 13, of which model 695 is part, can change the linear code value in response to both the status signal (613) and the linear code value (602) to compensate for the variations in the characteristics of the drive transistor and EL emitter in the EL subpixel, and specifically for variations in the efficiency of the EL emitter in the EL subpixel.

In parallel, the compensator receives a linear code value 602, e.g. a commanded voltage. This linear code value 602 is passed through the original I-V curve 691 of the panel measured at manufacturing time to determine the desired current 621. This is divided by the percent efficiency 614 in operation 628 to return the light output for the desired current to its manufacturing-time value. The resulting, boosted current is then passed through curve 692, the inverse of curve 691, to determine what commanded voltage will produce the amount of light desired in the presence of efficiency loss. The value out of curve 692 is passed to the next stage as efficiency-adjusted voltage 622.

If efficiency compensation is not desired, linear code value 602 is sent unchanged to the next stage as efficiency-adjusted voltage 622, as indicated by optional bypass path 626. Percent current 613 is calculated whether or not efficiency compensation is desired, but the percent efficiency 614 need not be.

Figure 5C:
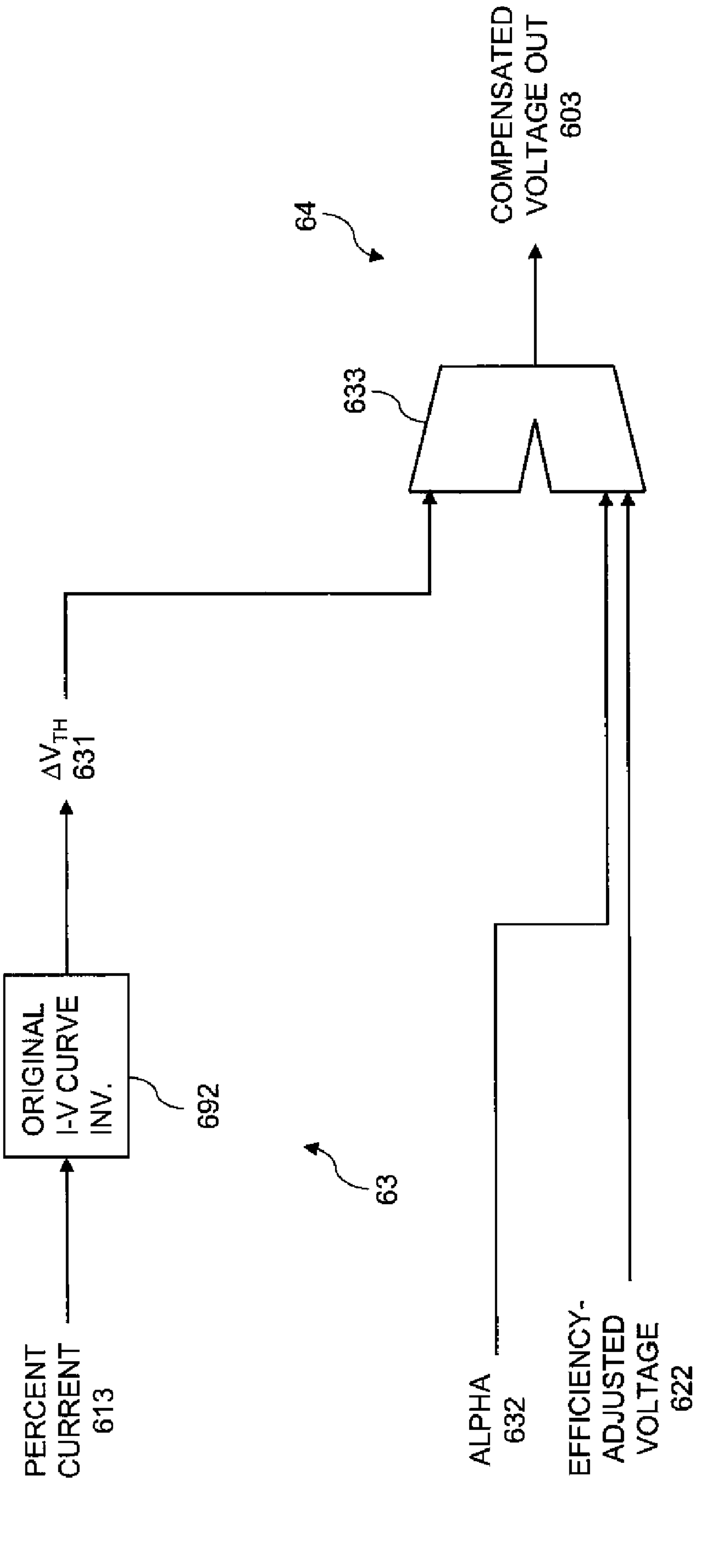
FIG. 5C is part two (of two) of a detailed dataflow diagram of the compensator.

FIG. 5C is an expanded view of FIG. 5A, blocks 63 and 64. It receives a percent current 613 and an efficiency-adjusted voltage 622 from the previous stages. Block 63, "Get compensation," includes mapping the percent current 613 through the inverse I-V curve 692 and subtracting the result (FIG. 4A 513) from the measurement reference gate voltage (510) to find the $V_{th}$ shift $\Delta V_{th}$ 631. Block 64, "Compensate," includes operation 633, which calculates the compensated voltage out 603 as given in Eq. 1:

$$V_{out}=V_{in}+\Delta V_{th}(1+\alpha(V_{g,ref}-V_{in})) \quad \text{(Eq. 1)}$$

where $V_{out}$ is compensated voltage out 603, $\Delta V_{th}$ is voltage shift 631, $\alpha$ is alpha value 632, $V_{g,ref}$ is the measurement reference gate voltage 510, and $V_{in}$ is the efficiency-adjusted voltage 622. The compensated voltage out can be expressed as a changed linear code value for a source driver, and compensates for variations in the characteristics of the drive transistor and EL emitter caused by operation of the drive transistor and EL emitter over time.

For straight $V_{th}$ shift, $\alpha$ will be zero, and operation 633 will reduce to adding the $V_{th}$ shift amount to the efficiency-adjusted voltage 622. For any particular subpixel, the amount to add is constant until new measurements are taken. When this is so, the voltage to add in operation 633 can be pre-computed after measurements are taken, permitting blocks 63 and 64 to collapse to looking up the stored value and adding it. This can save considerable logic.

Cross-Domain Processing, and Bit Depth

Image-processing paths known in the art typically produce nonlinear code values (NLCVs), that is, digital values having a nonlinear relationship to luminance (Giorgianni & Madden. *Digital Color Management: encoding solutions*. Reading, Mass.: Addison-Wesley, 1998. Ch. 13, pp. 283-295). Using nonlinear outputs matches the input domain of a typical source driver, and matches the code value precision range to the human eye's precision range. However, $V_{th}$ shift is a voltage-domain operation, and thus is preferably implemented in a linear-voltage space. A source driver can be used, and domain conversion performed before the source driver, to effectively integrate a nonlinear-domain image-processing path with a linear-domain compensator. Note that this discussion is in terms of digital processing, but analogous processing can be performed in an analog or mixed digital/analog system. Note also that the compensator can operate in linear spaces other than voltage. For example, the compensator can operate in a linear current space.

Figure 6:
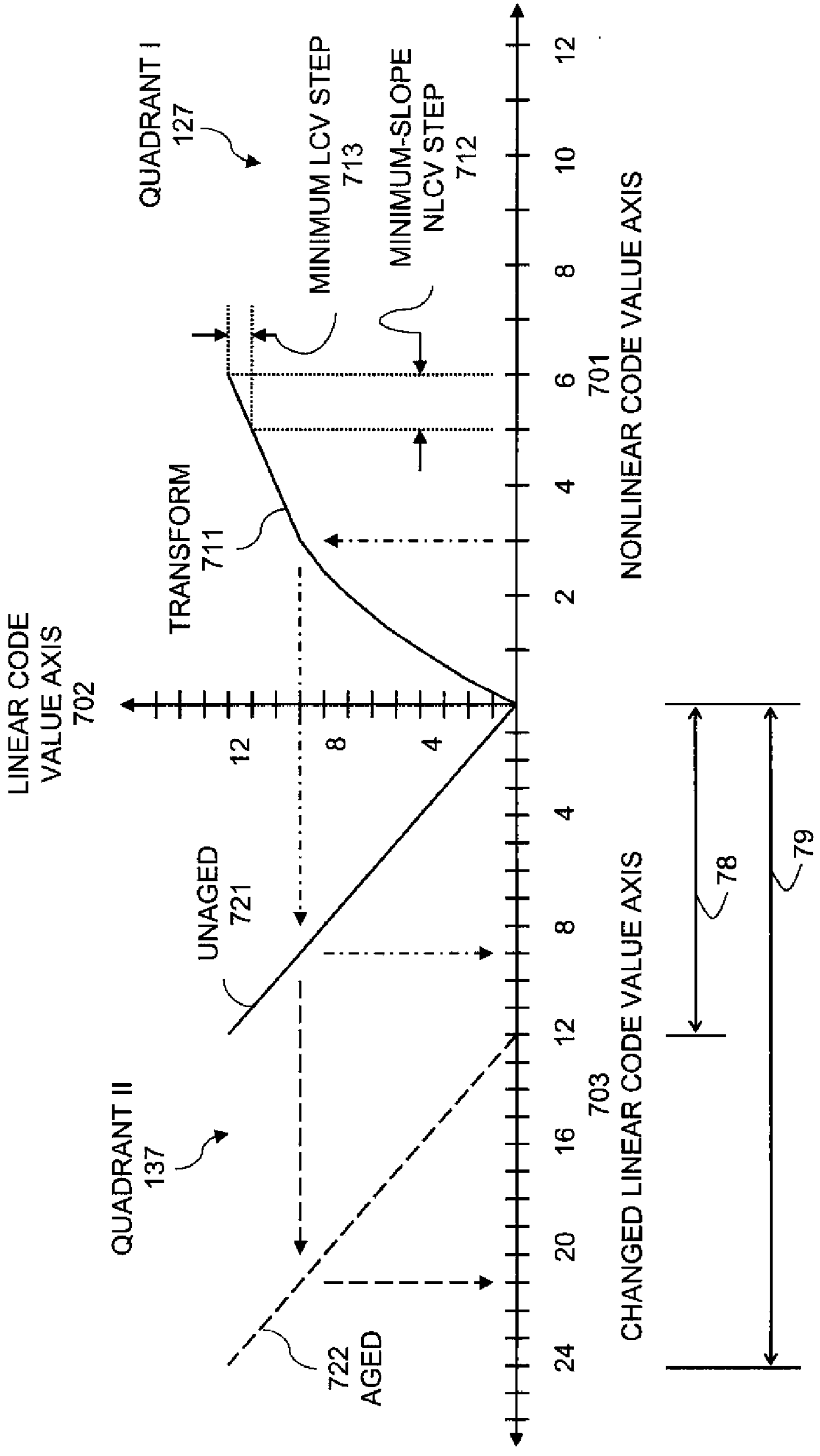
FIG. 6 is a Jones-diagram representation of the effect of a domain-conversion unit and a compensator.

Referring to FIG. 6, there is shown a Jones-diagram representation of the effect of a domain-conversion unit 12 in Quadrant I 127 and a compensator 13 in Quadrant II 137. This figure shows the mathematical effect of these units, not how they are implemented. The implementation of these units can be analog or digital, and can include a look-up table or function. Quadrant I represents the operation of the domain-conversion unit 12: nonlinear input signals, which can be nonlinear code values (NLCVs), on an axis 701 are converted by mapping them through a transform 711 to form linear code values (LCVs) on an axis 702. Quadrant II represents the operation of compensator 13: LCVs on axis 702 are mapped through transforms such as 721 and 722 to form changed linear code values (CLCVs) on axis 703.

Referring to Quadrant I, domain-conversion unit 12 receives respective NLCVs for each subpixel, and converts them to LCVs. This conversion should be performed with sufficient resolution to avoid objectionable visible artifacts such as contouring and crushed blacks. In digital systems, NLCV axis 701 can be quantized, as indicated in FIG. 6. For quantized NLCVs, LCV axis 702 should have sufficient resolution to represent the smallest change in transform 711 between two adjacent NLCVs. This is shown as NLCV step 712 and corresponding LCV step 713. As the LCVs are by definition linear, the resolution of the whole LCV axis 702 should be sufficient to represent step 713. Consequently, the LCVs can be defined with finer resolution than the NLCVs in order to avoid loss of image information. The resolution can be twice that of step 713 by analogy with the Nyquist sampling theorem.

Transform 711 is an ideal transform for an unaged subpixel. It has no relationship to aging of any subpixel or the panel as a whole. Specifically, transform 711 is not modified due to any $V_{th}$, $V_{oled}$, or OLED efficiency changes. There can be one transform for all colors, or one transform for each color. The domain-conversion unit, through transform 711, advantageously decouples the image-processing path from the compensator, permitting the two to operate together without having to share information. This simplifies the implementation of both. Domain-conversion unit 12 can be implemented as a look-up table or a function analogous to an LCD source driver.

Referring to Quadrant II, compensator 13 changes LCVs to changed linear code values (CLCVs). FIG. 6 shows the simple case, correction for straight $V_{th}$ shift, without loss of generality. Straight $V_{th}$ shift can be corrected for by straight voltage shift from LCVs to CLCVs. Other aging effects can be handled as described above in "Implementation."

Transform 721 represents the compensator's behavior for an unaged subpixel, for which the CLCV can be the same as the LCV. Transform 722 represents the compensator's behavior for an aged subpixel, for which the CLCV can be the LCV plus an offset representing the $V_{th}$ shift of the subpixel in question. Consequently, the CLCVs will generally require a large range than the LCVs in order to provide headroom for compensation. For example, if a subpixel requires 256 LCVs when it is new, and the maximum shift over its lifetime is 128 LCVs, the CLCVs will need to be able to represent values up to 384=256+128 to avoid clipping the compensation of heavily-aged subpixels.

FIG. 6 shows a complete example of the effect of the domain-conversion unit and compensator. Following the dash-dot arrows in FIG. 6, an NLCV of 3 is transformed by the domain-conversion unit 12 through transform 711 to an LCV of 9, as indicated in Quadrant I. For an unaged subpixel, the compensator 13 will pass that through transform 721 as a CLCV of 9, as indicated in Quadrant II. For an aged subpixel with a $V_{th}$ shift analogous to 12 CLCVs, the LCV of 9 will be converted through transform 722 to a CLCV of 9+12=21.

In one embodiment, the NLCVs from the image-processing path are nine bits wide. The LCVs are 11 bits wide. The transformation from nonlinear input signals to linear code values can be performed by a LUT or function. The compensator can take in the 11-bit linear code value representing the desired voltage and produce a 12-bit changed linear code value to send to a source driver 14. The source driver 14 can then drive the gate electrode of the drive transistor of the EL subpixel in response to the changed linear code value. The compensator can have greater bit depth on its output than its input to provide headroom for compensation, that is, to extend the voltage range 78 to voltage range 79 and simultaneously keep the same resolution across the new, expanded range, as required for minimum linear code value step 713. The compensator output range can extend below the range of transform 721 as well as above it.

Each panel design can be characterized to determine what the maximum $V_{th}$ shift, $V_{oled}$ rise and efficiency loss will be over the design life of a panel, and the compensator and source drivers can have enough range to compensate. This characterization can proceed from required current to required gate bias and transistor dimensions via the standard transistor saturation-region $I_{ds}$ equation, then to $V_{th}$ shift over time via various models known in the art for a-Si degradation over time.

Sequence of Operations

Panel Design Characterization

This section is written in the context of mass-production of a particular OLED emitter design. Before mass-production begins, the design can be characterized: accelerated life testing can be performed, and I-V curves can be measured for various subpixels of various colors on various sample substrates aged to various levels. The number and type of measurements required, and of aging levels, depend on the characteristics of the particular panel. With these measurements, a value alpha (α) can be calculated and a measurement reference gate voltage can be selected. Alpha (FIG. 5C, item 632) is a value representing the deviation from a straight shift over time. An α value of 0 indicates all aging is a straight shift on the voltage axis, as would be the case e.g. for $V_{th}$ shift alone. The measurement reference gate voltage (FIG. 4A 510) is the voltage at which aging signal measurements are taken for compensation, and can be selected to provide acceptable S/N ratio and keep power dissipation low.

The α value can be calculated by optimization. An example is given in Table 1. $\Delta V_{th}$ can be measured at a number of gate voltages, under a number of aging conditions. $\Delta V_{th}$ differences are then calculated between each $\Delta V_{th}$ and the $\Delta V_{th}$ at the measurement reference gate voltage 510. $V_g$ differences are calculated between each gate voltage and the measurement reference gate voltage 510. The inner term of Eq. 1, $\Delta V_{th} \cdot \alpha \cdot (V_{g,ref} - V_{in})$, can then be computed for each measurement to yield a predicted $\Delta V_{th}$ difference, using the appropriate $\Delta V_{th}$ at the measurement reference gate voltage 510 as $\Delta V_{th}$ in the equation, and using the appropriate calculated gate voltage difference as $(V_{g,ref} - V_i n)$. The α value can then be selected iteratively to reduce, and preferably mathematically minimize, the error between the predicted $\Delta V_{th}$ differences and the calculated $\Delta V_{th}$ differences. Error can be expressed as the maximum difference or the RMS difference.

Alternative methods known in the art, such as least-squares fitting of $\Delta V_{th}$ difference as a function of $V_g$ difference, can also be used.

TABLE 1

Example of α calculation

| Vg | $\Delta V_{th}$ Day 1 | $\Delta V_{th}$ Day 8 | $V_g$ difference | $\Delta V_{th}$ difference Day 1 | $\Delta V_{th}$ difference Day 8 | Predicted $\Delta V_{th}$ difference Day 1 | Predicted $\Delta V_{th}$ difference Day 8 | Error Day 1 | Error Day 8 |
|---|---|---|---|---|---|---|---|---|---|
| ref = 13.35 | 0.96 | 2.07 | 0 | 0 | 0 | 0.00 | 0.00 | 0.00 | 0.00 |
| 12.54 | 1.05 | 2.17 | 0.81 | 0.09 | 0.1 | 0.04 | 0.08 | 0.05 | 0.02 |
| 11.72 | 1.1 | 2.23 | 1.63 | 0.14 | 0.16 | 0.08 | 0.17 | 0.06 | −0.01 |
| 10.06 | 1.2 | 2.32 | 3.29 | 0.24 | 0.25 | 0.16 | 0.33 | 0.08 | −0.08 |
| | | | $V_{g,ref} - V_{in}$ | | | α = 0.0491 | | max = 0.08 | |

In addition to α and the measurement reference gate voltage, characterization can also determine, as described above, $V_{oled}$ shift as a function of $V_{th}$ shift, efficiency loss as a function of $V_{th}$ shift, self-heating component per subpixel, maximum $V_{th}$ shift, $V_{oled}$ shift and efficiency loss, and resolution required in the nonlinear-to-linear transform and in the compensator. Resolution required can be characterized in conjunction with a panel calibration procedure such as co-pending commonly-assigned U.S. Patent Application Publication No. 2008/0252653, the disclosure of which is incorporated herein. Characterization also determines, as will be described in "In the field," below, the conditions for taking characterization measurements in the field, and which embodiment of the status signal generation unit 240 to employ for a particular panel design. All these determinations can be made by those skilled in the art.

Mass-Production

Once the design has been characterized, mass-production can begin. At manufacturing time, appropriate values are measured for each subpixel produced according to a selected embodiment of the status signal generation unit 240. For example, I-V curves and subpixel currents can be measured. Current can be measured at enough drive voltages to make a realistic I-V curve; any errors in the I-V curve can affect the results. Subpixel currents can be measured at the measurement reference gate voltage to provide target signals $i_0$ 611. The I-V curves and reference currents are stored in a nonvolatile memory associated with the subpixel and it is sent into the field.

In the Field

Once in the field, the subpixel ages at a rate determined by on how hard it is driven. After some time the subpixel has shifted far enough that it needs to be compensated; how to determine that time is considered below.

To compensate, compensation measurements are taken and applied. The compensation measurements are of the current of the subpixel at the measurement reference gate voltage. The measurements are applied as described in "Algorithm," above. The measurements are stored so they can be applied whenever that subpixel is driven, until the next time measurements are taken.

Figure 7:
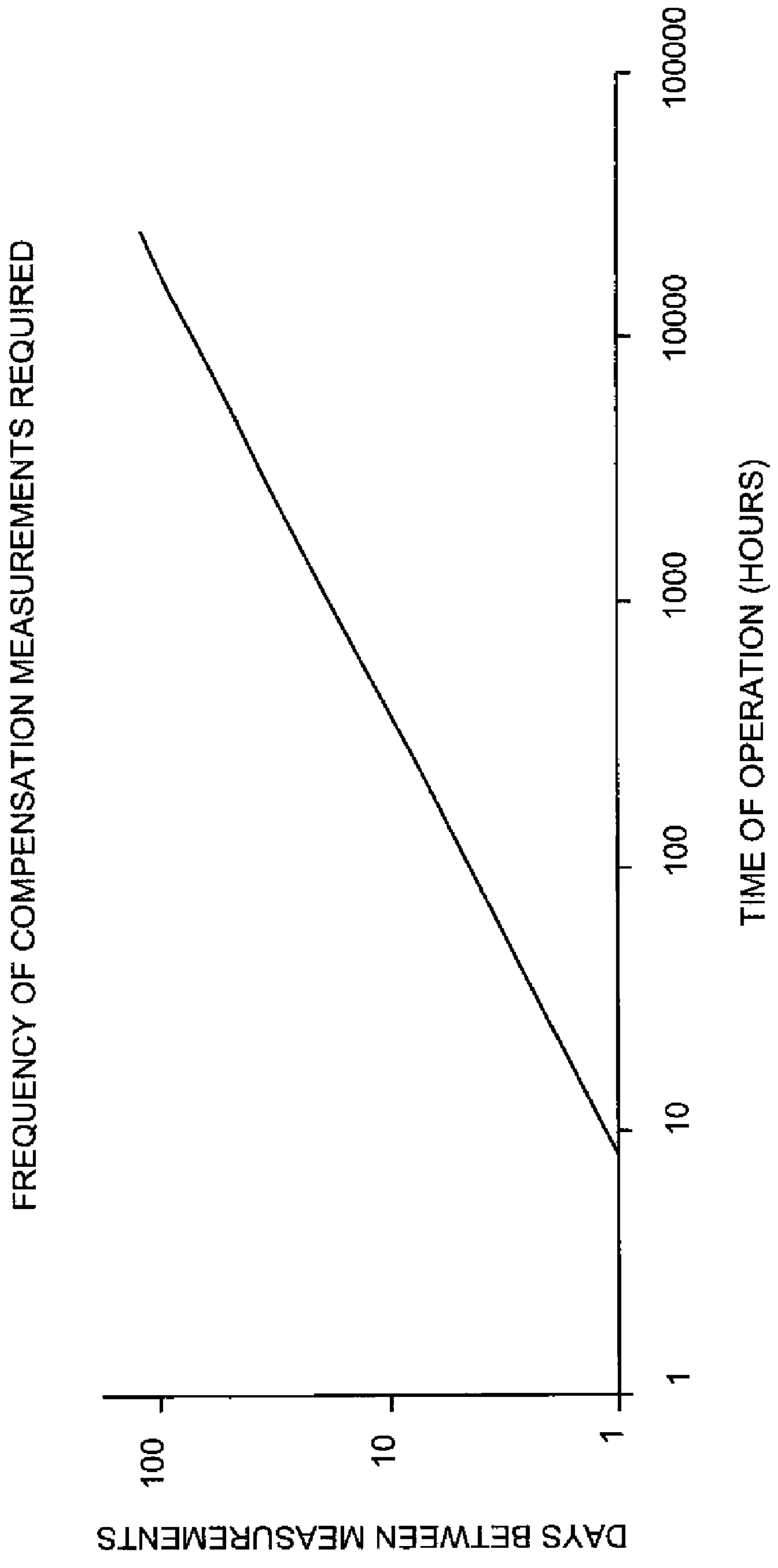
FIG. 7 is a representative plot showing frequency of compensation measurements over time.

Compensation measurements can be taken as frequently or infrequently as desired; a typical range can be once every eight hours to once every four weeks. FIG. 7 shows one example of how often compensation measurements might have to be taken as a function of how long the panel is active. This curve is only an example; in practice, this curve can be determined for any particular subpixel design through accelerated life testing of that design. The measurement frequency can be selected based on the rate of change in the characteristics of the drive transistor and EL emitter over time; both shift faster when the panel is new, so compensation measurements can be taken more frequently when the panel is new than when it is old. There are a number of ways to determine when to take compensation measurements. For example, the current drawn by the subpixel at some given drive voltage can be measured and compared to a previous result of the same measurement. In another example, environmental factors which affect the panel, such as temperature and ambient light, can be measured, and compensation measurements taken e.g. if the ambient temperature has changed more than some threshold.

For example, the EL subpixel 15 shown in FIG. 2 is for an N-channel drive transistor and a non-inverted EL structure. The EL emitter 202 is tied to the second supply electrode 205, which is the source of the drive transistor 201, higher voltages on the gate electrode 203 command more light output, and voltage supply 211 is more positive than second voltage supply 206, so current flows from 211 to 206. However, this invention is applicable to any combination of P- or N-channel drive transistors and non-inverted (common-cathode) or inverted (common-anode) EL emitters. The appropriate modifications to the circuits for these cases are well-known in the art.

In a preferred embodiment, the invention is employed in a subpixel that includes Organic Light Emitting Diodes (OLEDs) which are composed of small molecule or polymeric OLEDs as disclosed in but not limited to U.S. Pat. No. 4,769,292, by Tang et al., and U.S. Pat. No. 5,061,569, by VanSlyke et al. Many combinations and variations of organic light emitting materials can be used to fabricate such a panel. Referring to FIG. 2, when EL emitter 202 is an OLED emitter, EL subpixel 15 is an OLED subpixel. This invention also applies to EL emitters other than OLEDs. Although the degradation modes of other EL emitter types can be different than the degradation modes described herein, the measurement, modeling, and compensation techniques of the present invention can still be applied.

The above embodiments can apply to any active matrix backplane that is not stable as a function of time (such as a-Si). For example, transistors formed from organic semiconductor materials and zinc oxide are known to vary as a function of time and therefore this same approach can be applied to these transistors. Furthermore, as the present invention can compensate for EL emitter aging independently of transistor aging, this invention can also be applied to an active-matrix backplane with transistors that do not age, such as low-temperature poly-silicon (LTPS) TFTs. On an LTPS backplane, the drive transistor 201 and select transistor 36 are low-temperature polysilicon transistors.

The invention has been described in detail with particular reference to certain preferred embodiments thereof, but it will be understood that variations and modifications can be effected within the spirit and scope of the invention.

| PARTS LIST | |
|---|---|
| 10 | system |
| 11 | nonlinear input signal |
| 12 | converter to voltage domain |
| 13 | compensator |
| 14 | source driver |
| 15 | EL subpixel |
| 16 | current-measurement circuit |
| 32 | column line |
| 34 | gate line |
| 36 | select transistor |
| 41 | measurement |
| 43 | difference |
| 49 | measurement |
| 61 | block |
| 62 | block |
| 63 | block |
| 64 | block |
| 78 | voltage range |
| 79 | voltage range |
| 90 | linear fit |
| 127 | quadrant |
| 137 | quadrant |
| 200 | switch |
| 201 | drive transistor |
| 202 | EL emitter |
| 203 | gate electrode |
| 204 | first supply electrode |
| 205 | second supply electrode |
| 206 | voltage supply |
| 207 | first electrode |
| 208 | second electrode |
| 210 | current mirror unit |
| 211 | voltage supply |
| 212 | first current mirror |
| 213 | first current mirror output |
| 214 | second current mirror |
| 215 | bias supply |
| 216 | current-to-voltage converter |
| 220 | correlated double-sampling unit |
| 221 | sample-and-hold unit |
| 222 | sample-and-hold unit |
| 223 | differential amplifier |
| 230 | analog-to-digital converter |
| 240 | status signal generation unit |
| 501 | unaged I-V curve |
| 502 | aged I-V curve |
| 503 | voltage difference |
| 504 | voltage difference |
| 505 | voltage difference |
| 506 | voltage difference |
| 510 | measurement reference gate voltage |
| 511 | current |
| 512a | current |
| 512b | current |
| 513 | voltage |
| 514 | voltage shift |
| 550 | voltage shift |
| 552 | voltage shift |
| 602 | linear code value |
| 603 | compensated voltage |
| 611 | current |
| 612 | current |
| 613 | percent current |
| 614 | percent efficiency |
| 615 | mura-correction gain term |
| 616 | mura-correction offset term |
| 619 | memory |
| 621 | current |
| 622 | voltage |
| 626 | block |
| 628 | operation |
| 631 | voltage shift |
| 632 | alpha value |
| 633 | operation |
| 691 | I-V curve |
| 692 | inverse of I-V curve |
| 695 | model |
| 701 | axis |
| 702 | axis |
| 703 | axis |
| 711 | smallest change in transform |
| 712 | step |
| 713 | step |
| 721 | transform |
| 722 | transform |
| 1002 | storage capacitor |
| 1011 | bus line |
| 1012 | sheet cathode |

The invention claimed is:

1. An apparatus for providing a drive transistor control signal to a gate electrode of a drive transistor in an electroluminescent (EL) subpixel, comprising:

the electroluminescent (EL) subpixel having an EL emitter with a first and second electrode, and comprising the drive transistor with a first supply electrode, a second supply electrode, and the gate electrode, the second supply electrode of the drive transistor being electrically connected to the first electrode of the EL emitter for applying current to the EL emitter;

a first voltage supply electrically connected to the first supply electrode of the drive transistor;

a second voltage supply electrically connected to the second electrode of the EL emitter;

a test voltage source electrically connected to the gate electrode of the drive transistor;

a voltage controller for controlling voltages of the first voltage supply, second voltage supply, and test voltage source to operate the drive transistor in a linear region;

a measuring circuit for measuring the current passing through the first and second supply electrodes of the drive transistor at different times to provide a status signal representing variations in the characteristics of the drive transistor and EL emitter caused by operation of the drive transistor and EL emitter over time, the current being measured while the drive transistor is operated in the linear region;

means for providing a linear code value;

a compensator for changing the linear code value in response to the status signal to compensate for the variations in the characteristics of the drive transistor and EL emitter; and a source driver for producing the drive transistor control signal in response to the changed linear code value for driving the gate electrode of the drive transistor, wherein the measuring circuit comprises:

a first current mirror for producing a mirrored current which is a function of the drive current passing through the first and second supply electrodes, and a second current mirror for applying a bias current to the first current mirror to reduce impedance of the first current mirror.

2. The apparatus of claim 1, wherein the EL emitter comprises an OLED emitter.

3. The apparatus of claim 1, wherein the drive transistor comprises a low temperature polysilicon transistor.

4. The apparatus of claim 1, further including a switch for selectively electrically connecting the measuring circuit to the current flow through the first and second supply electrodes.

5. The apparatus of claim 1, wherein the measuring circuit further comprises:

a current to voltage converter responsive to the mirrored current for producing a voltage signal; and means responsive to the voltage signal for providing the status signal to the compensator.

6. The apparatus of claim 1, wherein the drive transistor control signal comprises a voltage.

7. The apparatus of claim 1, wherein the measured current is less than a selected threshold current.

8. The apparatus of claim 1, wherein the measuring circuit further includes a memory for storing a target signal and a most recent current measurement.

9. The apparatus of claim 1, wherein the compensator further produces a changed linear code value in response to the linear code value to compensate for the variations in the characteristics of the drive transistor and EL emitter.

* * * * *